(12) United States Patent
Lee

(10) Patent No.: US 10,882,465 B2
(45) Date of Patent: Jan. 5, 2021

(54) VEHICULAR CAMERA APPARATUS AND METHOD

(71) Applicant: LG Electronics Inc., Seoul (KR)

(72) Inventor: Manhyung Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/335,789

(22) PCT Filed: Nov. 26, 2016

(86) PCT No.: PCT/KR2016/013738
§ 371 (c)(1),
(2) Date: Mar. 22, 2019

(87) PCT Pub. No.: WO2018/056515
PCT Pub. Date: Mar. 29, 2018

(65) Prior Publication Data
US 2019/0248302 A1 Aug. 15, 2019

(30) Foreign Application Priority Data

Sep. 22, 2016 (KR) .................. 10-2016-0121742

(51) Int. Cl.
*B60R 11/04* (2006.01)
*G06T 7/70* (2017.01)
*B60R 1/00* (2006.01)
*H04N 5/225* (2006.01)
*H04N 5/238* (2006.01)
*B60R 21/0134* (2006.01)
*B60W 40/02* (2006.01)
*G02B 26/08* (2006.01)
*H04N 5/232* (2006.01)

(52) U.S. Cl.
CPC ................ *B60R 11/04* (2013.01); *B60R 1/00* (2013.01); *B60R 21/0134* (2013.01); *B60W 40/02* (2013.01); *G02B 26/08* (2013.01); *G06T 7/70* (2017.01); *H04N 5/225* (2013.01); *H04N 5/2252* (2013.01); *H04N 5/2254* (2013.01); *H04N 5/2257* (2013.01); *H04N 5/238* (2013.01); *H04N 5/23238* (2013.01); *B60R 2300/105* (2013.01); *B60R 2300/107* (2013.01); *B60R 2300/30* (2013.01); *G06T 2207/30248* (2013.01)

(58) Field of Classification Search
USPC .................................. 348/148, 374; 382/154
See application file for complete search history.

(56) References Cited

U.S. PATENT DOCUMENTS

| 6,272,237 | B1* | 8/2001 | Hashima | ................. | G06K 9/00 |
| | | | | | 348/113 |
| 7,965,336 | B2* | 6/2011 | Bingle | ................... | B60R 11/04 |
| | | | | | 348/374 |

(Continued)

*Primary Examiner* — Thai Q Tran
*Assistant Examiner* — Syed Y Hasan
(74) *Attorney, Agent, or Firm* — Fish & Richardson P.C.

(57) ABSTRACT

A vehicular camera apparatus includes an image sensor, and a processor configured to divide an image acquired through the image sensor into a first field of view (FOV) range in a first direction and a second FOV range in the first direction, to process a first region corresponding to the first FOV range in the image, to process a second region corresponding to the second FOV range in the image, and to separately process the first region and the second region.

20 Claims, 22 Drawing Sheets

(56) References Cited

U.S. PATENT DOCUMENTS

| | | | |
|---|---|---|---|
| 2005/0083405 A1* | 4/2005 | Imoto | B60R 1/00 |
| | | | 348/148 |
| 2015/0178576 A1* | 6/2015 | Gupta | G06K 9/00805 |
| | | | 348/148 |
| 2016/0240085 A1* | 8/2016 | Otsuka | G06K 9/00805 |

* cited by examiner

|  | HORIZONTAL | VERTICAL |
|---|---|---|
| VIEWING ANGLE (deg) | 65 | 39.43 |
| PIXEL NUMBER(pixels) | 1920 | 1080 |
| SENSOR SIZE(mm) | 5.76 | 3.24 |
| FOCAL LENGTH (mm) | 4.52 | |
| FIELD SIZE @ 80(m) | 102 | 57.33 |
| MAGNIFICATION @ 80m | -1/17696 x | |
| RECOGNITION MODEL (HUMAN /80m) | SENSOR | 16 pixel | 32 pixel |
| | FIELD | 0.85m | 1.7m |
| MAGNIFICATION @ 80m | -1/33180 x | |
| RECOGNITION MODEL (VEHICLE /150m) | SENSOR | 18 pixel | 16 pixel |
| | FIELD | 1.79m | 1.79m |

VEHICULAR CAMERA APPARATUS AND METHOD

CROSS-REFERENCE TO RELATED APPLICATIONS

This application is a National Stage application under 35 U.S.C. § 371 of International Application No. PCT/KR2016/013738, filed on Nov. 26, 2016, which claims the benefit of Korean Application No. 10-2016-0121742, filed on Sep. 22, 2016. The disclosures of the prior applications are incorporated by reference in their entirety.

BACKGROUND OF THE INVENTION

1. Field of the Invention

The present invention relates to a vehicular camera apparatus.

2. Description of the Related Art

A vehicle refers to a device that carries a passenger in a passenger-intended direction. A car is a major example of the vehicle.

To increase the convenience of vehicle users, a vehicle is equipped with various sensors and electronic devices. Especially, an advanced driver assistance system (ADAS) and an autonomous vehicle are under active study to increase the driving convenience of users.

A vehicle includes various sensors in order to implement an ADAS and an autonomous vehicle. In particular, a camera apparatus is an inevitable sensor for implementing the ADAS and the autonomous vehicle.

A plurality of camera apparatuses may be installed in a vehicle. For example, the vehicle may include a camera for a long distance and a camera for a short distance, as a camera for acquiring a front image of the image. The camera for a long distance requires a length with a narrow field of view and a high magnification, and the camera for a short distance requires a wide angle lens, and accordingly, the cameras for long and short distances are separately required.

When a vehicle includes a plurality of cameras, there is a problem in that the price of the vehicle is increased and the cameras occupy an in-vehicle space, and it is required to process images acquired by the plurality of cameras, and accordingly, there is a problem in terms of an increased burden to a processor.

DISCLOSURE

Technical Problem

Therefore, the present invention has been made in view of the above problems, and it is an object of the present invention to provide a vehicular camera apparatus for detecting an object positioned at a long distance and a short distance.

It is an object of the present invention to provide a vehicle including the vehicular camera apparatus.

It is to be understood that both the foregoing general description and the following detailed description of the present invention are exemplary and explanatory and are intended to provide further explanation of the invention as claimed.

Technical Solution

In accordance with the present invention, the above and other objects can be accomplished by the provision of a vehicular camera apparatus including an image sensor, and a processor configured to divide an image acquired through the image sensor into a first field of view (FOV) range in a first direction and a second FOV range in the first direction, to process a first region corresponding to the first FOV range in the image, to process a second region corresponding to the second FOV range in the image, and to separately process the first region and the second region.

Details of other embodiments are included in detailed descriptions and drawings.

Advantageous Effects

As is apparent from the foregoing description, the embodiments of the present invention have the following one or more effects.

First, both long distance recognition and short distance recognition may be possible using one camera.

Second, a pixel number and size of an image sensor may be minimized to lower manufacturing costs of a vehicular camera apparatus.

Third, the volume of a camera apparatus may be reduced to advantageously ensure an in-vehicle space.

Fourth, an existing developed algorithm may be easily used.

It will be appreciated by persons skilled in the art that that the effects that could be achieved with the present invention are not limited to what has been particularly described hereinabove and other advantages of the present invention will be more clearly understood from the following claims.

DETAILED DESCRIPTION OF THE PREFERRED EMBODIMENTS

Figure 1:
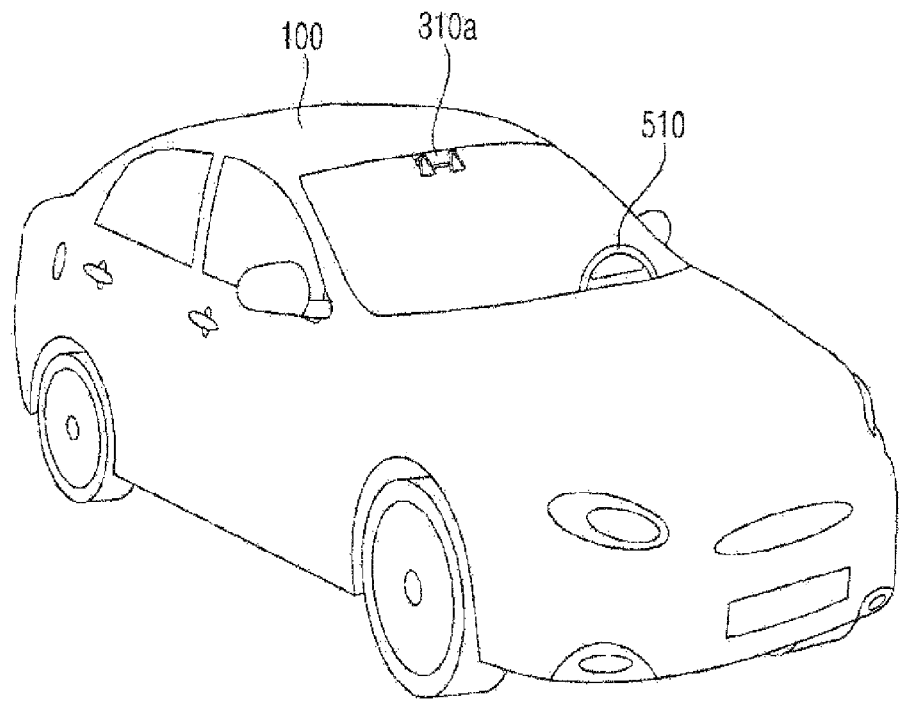
FIG. 1 shows the exterior of a vehicle according to an embodiment of the present invention.
Figure 1:
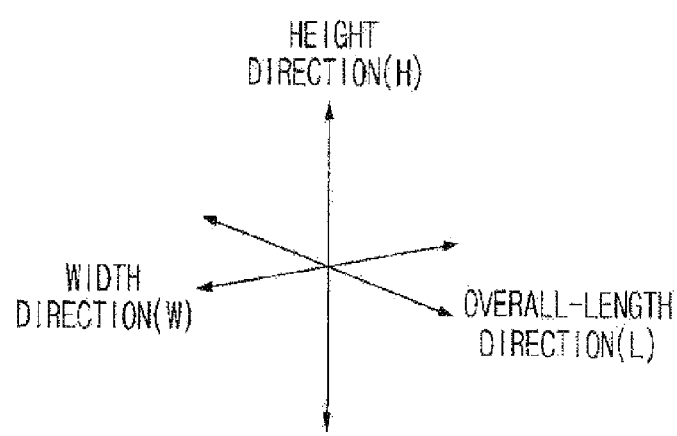

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

FIG. 1 shows the exterior of a vehicle according to an embodiment of the present invention.

Figure 2:
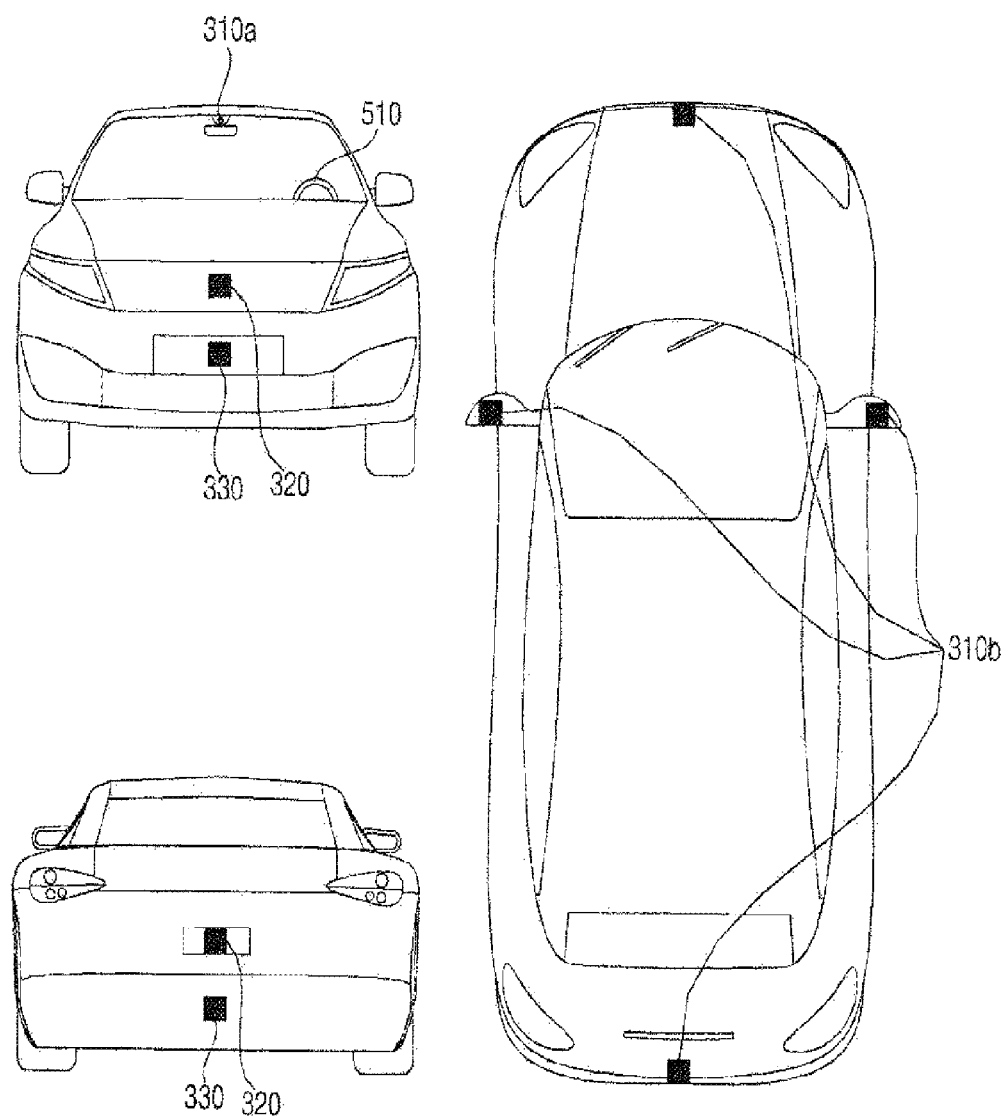
FIG. 2 is a view illustrating exteriors of a vehicle, seen at various angles from the outside of the vehicle according to an embodiment of the present invention.

FIG. 2 is a view illustrating exteriors of a vehicle, seen at various angles from the outside of the vehicle according to an embodiment of the present invention.

Figure 3:
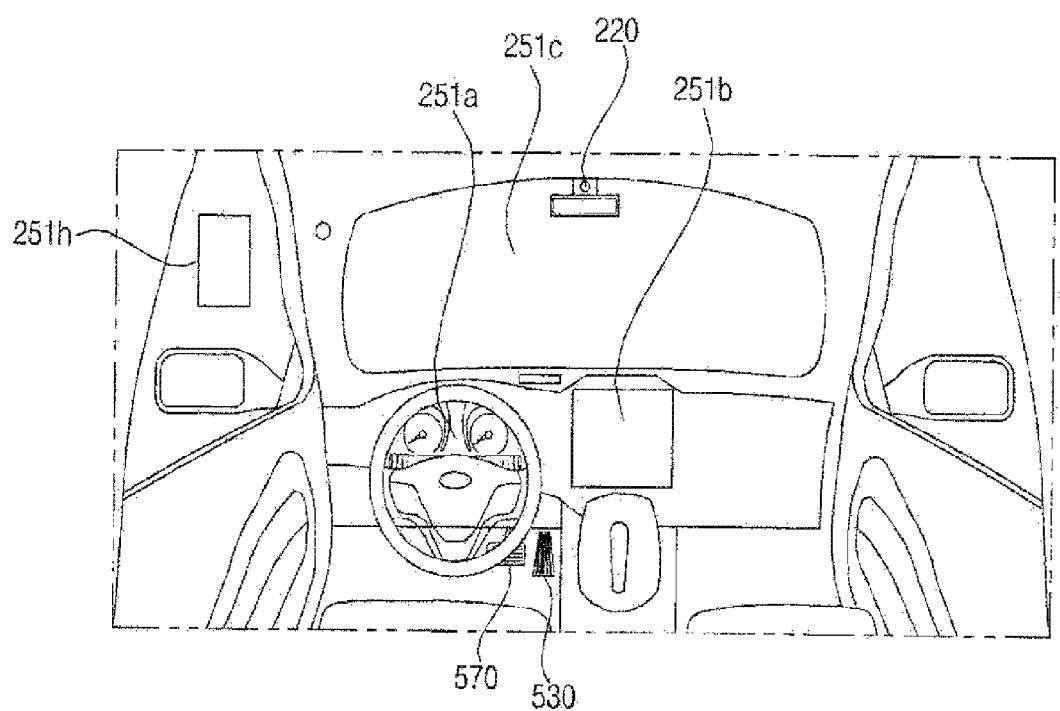
FIGS. 3 and 4 are views illustrating the interior of a vehicle according to an embodiment of the present invention.
Figure 4:
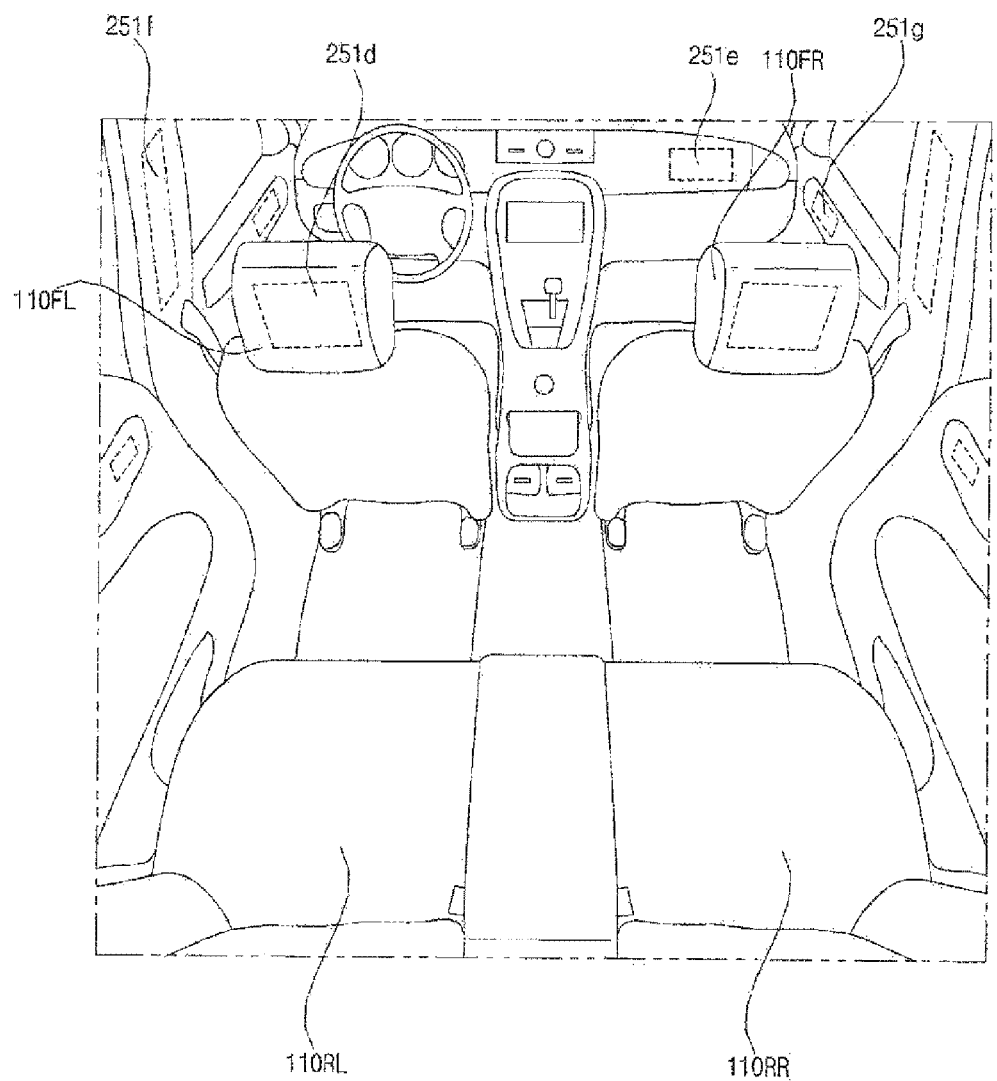

FIGS. 3 and 4 are views illustrating the interior of a vehicle according to an embodiment of the present invention.

Figure 5:
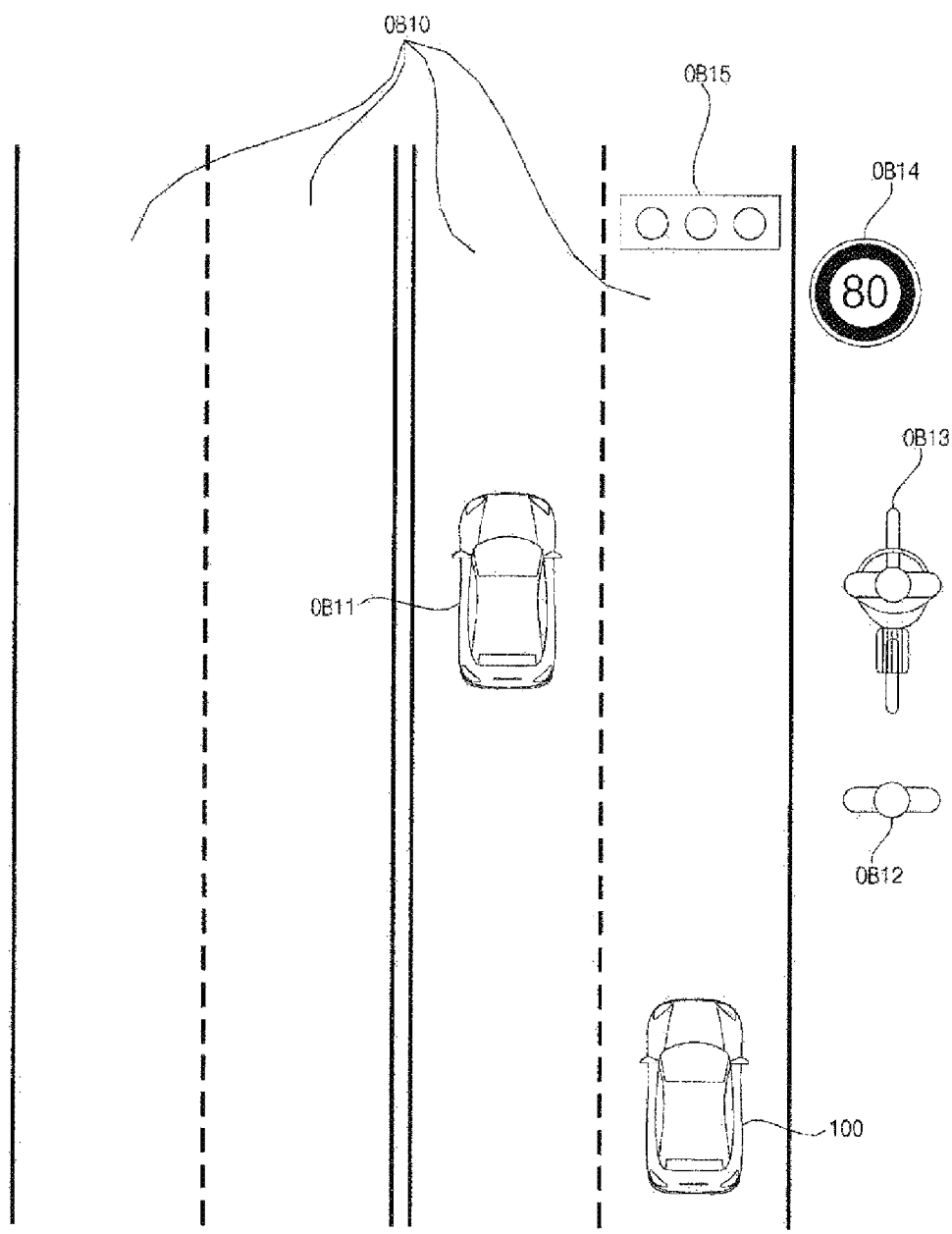
FIGS. 5 and 6 are views referred to for describing objects according to an embodiment of the present invention.
Figure 6:
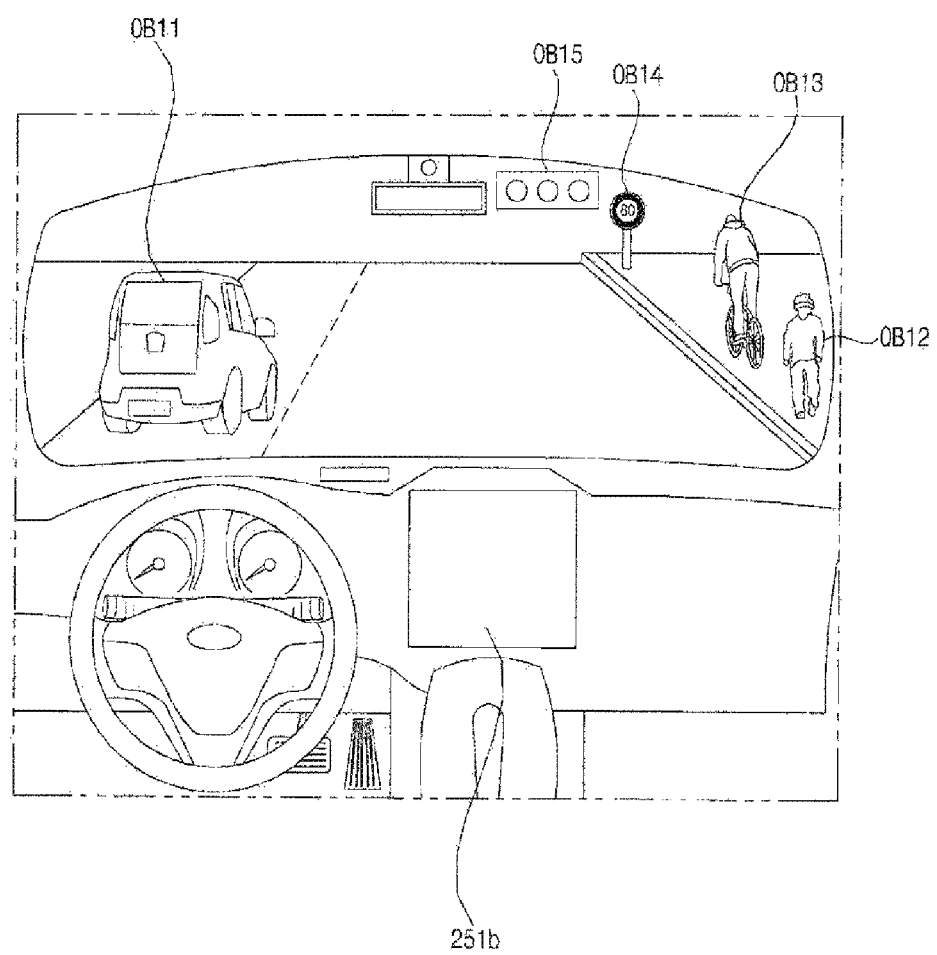

FIGS. 5 and 6 are views referred to for describing objects according to an embodiment of the present invention.

Figure 7:
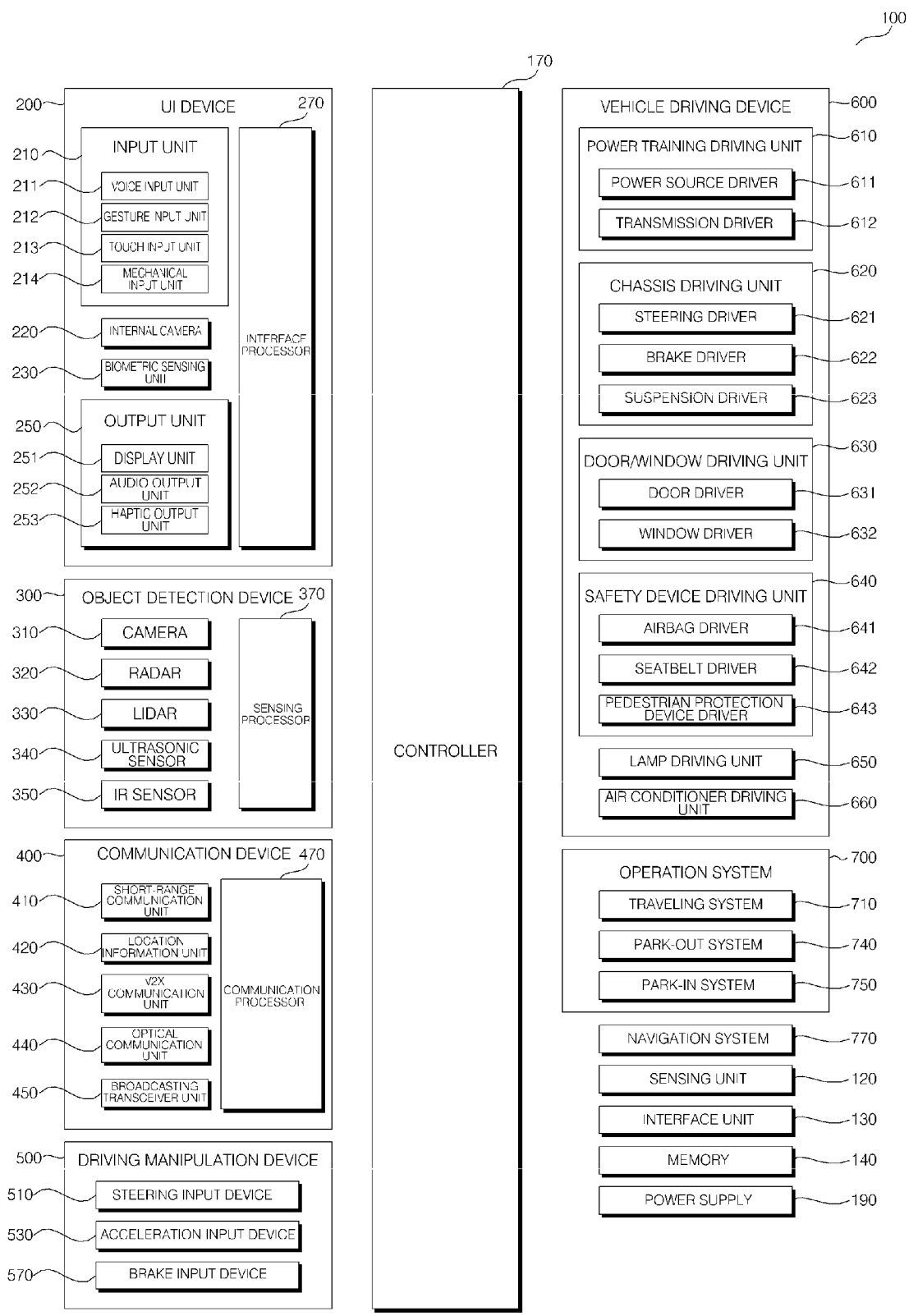
FIG. 7 is a block diagram of a vehicle according to an embodiment of the present invention.

FIG. 7 is a block diagram of a vehicle according to an embodiment of the present invention.

Referring to FIGS. 1 to 7, a vehicle 100 may include wheels rotated by a power source, and a steering input device 510 for controlling a travel direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on traveling situation information.

The traveling situation information may include at least one of information about objects outside the vehicle, navigation information, or vehicle state information.

For example, the vehicle 100 may switch from the manual mode to the autonomous driving mode or from the autonomous driving mode to the manual mode, based on traveling situation information generated from an object detection device 300.

For example, the vehicle 100 may switch from the manual mode to the autonomous driving mode or from the autonomous driving mode to the manual mode, based on traveling situation information generated from a communication device 400.

The vehicle 100 may switch from the manual mode to the autonomous driving mode or from the autonomous driving mode to the manual mode, based on information, data, or a signal provided from an external device.

If the vehicle 100 travels in the autonomous driving mode, the autonomous vehicle 100 may be operated based on an operation system 700.

For example, the autonomous vehicle 100 may travel based on information, data, or signals generated from a traveling system 710, a park-out system 740, and a park-in system.

If the vehicle 100 drives in the manual mode, the autonomous vehicle 100 may receive a user input for driving through a driving manipulation device 500. The vehicle 100 may travel based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

As illustrated in FIG. 7, the vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, a controller 170, and a power supply 190.

In some embodiments, the vehicle 100 may further include a new component in addition to the components described in the present invention, or may not include a part of the described components.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some embodiments, the UI device 200 may further include a new component in addition to components described below, or may not include a part of the described components.

The input unit 210 is provided to receive information from a user. Data collected by the input unit 210 may be analyzed by the processor 270 and processed as a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor or an image sensor, for sensing a gesture input of the user.

In some embodiments, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some embodiments, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, a door, or the like.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and so on of a user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphic objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touchscreen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFFL) display, a transparent OLED display, a transparent LCD, a transmissive transparent display, or a transparent LED display. The transparency of the transparent display is adjustable.

The UI device 200 may include a plurality of display units 251a to 251g.

The display unit 251 may be disposed in an area of the steering wheel, areas 251a, 251b, and 251e of the instrument panel, an area 251d of a seat, an area 251f of a pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, so that a user may perceive the output.

The processor 270 may control an operation of each unit of the UI device 200.

In some embodiments, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

Referring to FIGS. 5 and 6, the object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a traveling lane, a lane next to the traveling lane, and a lane in which a vehicle is driving in the opposite direction. The lane OB10 may conceptually include left and right lines that define each of the lanes.

The other vehicle OB11 may be a vehicle traveling in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The two-wheel vehicle OB13 may refer to a transportation means moving on two wheels, located around the vehicle 100. The two-wheel vehicle OB13 may be a transportation means having two wheels, located within a predetermined distance from the vehicle 100. For example, the 2-wheel vehicle OB13 may be a motorcycle or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object fixed on the ground, near to a road. For example, the structure may be any of a street lamp, a street tree, a building, a utility pole, a signal lamp, and a bridge.

The geographical feature may include a mountain, a hill, and so on.

Objects may be classified into mobile objects and stationary objects. For example, the mobile objects may conceptually include another vehicle and a pedestrian. For example, the stationary objects may conceptually include a traffic signal, a road, and a structure.

The object detection device 300 may include a camera 310, a Radio Detection and Ranging (RADAR) 320, a Light Detection and Ranging (LiDAR) 330, an ultrasonic sensor 340, an IR sensor 350, and a processor 370.

In some embodiments, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, around view monitoring (AVM) cameras 310b, or a 360-degree camera.

The camera 310 may acquire information about the location of an object, information about a distance to the object, or information about a relative speed with respect to the object by any of various image processing algorithms.

For example, the camera 310 may acquire information about a distance to an object and information about a relative speed with respect to the object in an acquired image, based on a variation in the size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100.

The processor 370 may control an overall operation of each unit of the object detection device 300.

The processor 370 may detect and track an object based on the acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in the size of the object over time.

For example, the processor 370 may acquire information about a distance to an object and information about a relative speed with respect to the object from an image acquired from the stereo camera 310a.

For example, the processor 370 may acquire information about a distance to an object and information about a relative speed with respect to the object from an image acquired from the stereo camera 310a, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

In some embodiments, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, or a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and a processor 470.

In some embodiments, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a global positioning system (GPS) module or a Differential Global Positioning System (DGPS) module.

The V2X communication unit 430 is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some embodiments, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control an overall operation of each unit of the communication device 400.

In some embodiments, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 may take the form of a wheel to rotate to provide a steering input. In some embodiments, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some embodiments, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train driving unit 610, a chassis driving unit 620, a door/window driving unit 630, a safety device driving unit 640, a lamp driving unit 650, or an air conditioner driving unit 660.

In some embodiments, the vehicle driving device 600 may further include a new component in addition to components described below or may not include a part of the components.

The vehicle driving device 600 may include a processor. Each unit of the vehicle driving device 600 may include a processor.

The power train driving unit 610 may control operation of a power train device.

The power train driving unit 610 may include a power source driver 611 and a transmission driver 612.

The power source driver 611 may control a power source of the vehicle 100.

For example, if the power source is a fossil fuel-based engine, the power source driver 611 may perform electronic control on the engine. Therefore, the power source driver 611 may control an output torque of the engine, and the like. The power source driver 611 may adjust the engine output torque under control of the controller 170.

For example, if the power source is an electrical energy-based motor, the power source driver 610 may control the motor. The power source driver 610 may adjust a rotation speed, torque, and so on of the motor under control of the controller 170.

The transmission driver 612 may control a transmission. The transmission driver 612 may adjust a state of the transmission. The transmission driver 612 may adjust the state of the transmission to drive D, reverse R, neutral N, or park P.

If the power source is the engine, the transmission driver 612 may adjust the engagement state of gears in the drive mode D.

The chassis driving unit 620 may control operation of a chassis device.

The chassis driving unit 620 may include a steering driver 621, a brake driver 622, and a suspension driver 623.

The steering driver 621 may perform electronic control on a steering device in the vehicle 100. The steering driver 621 may change a travel direction of the vehicle 100.

The brake driver 622 may perform electronic control on a brake device in the vehicle 100. For example, the brake driver 622 may decrease the speed of the vehicle 100 by controlling an operation of a brake disposed at a wheel.

The brake driver 622 may control a plurality of brakes individually. The brake driver 622 may control braking power applied to a plurality of wheels differently.

The suspension driver 623 may perform electronic control on a suspension device in the vehicle 100. For example, if the surface of a road is rugged, the suspension driver 623 may control the suspension device to reduce jerk of the vehicle 100.

The suspension driver 623 may control a plurality of suspensions individually.

The door/window driving unit 630 may perform electronic control on a door device or a window device in the vehicle 100.

The door/window driving unit 630 may include a door driver 631 and a window driver 632.

The door driver 631 may perform electronic control on a door device in the vehicle 100. For example, the door driver 631 may control opening and closing of a plurality of doors in the vehicle 100. The door driver 631 may control opening or closing of the trunk or the tail gate. The door driver 631 may control opening or closing of the sunroof.

The window driver 632 may perform electronic control on a window device in the vehicle 100. The window driver 632 may control opening or closing of a plurality of windows in the vehicle 100.

The safety device driving unit 640 may perform electronic control on various safety devices in the vehicle 100.

The safety device driving unit 640 may include an airbag driver 641, a seatbelt driver 642, and a pedestrian protection device driver 643.

The airbag driver 641 may perform electronic control on an airbag device in the vehicle 100. For example, the airbag driver 641 may control inflation of an airbag, upon sensing an emergency situation.

The seatbelt driver 642 may perform electronic control on a seatbelt device in the vehicle 100. For example, the seatbelt driver 642 may control securing of passengers on the seats 110FL, 110FR, 110RL, and 110RR by means of seatbelts, upon sensing a danger.

The pedestrian protection device driver 643 may perform electronic control on a hood lift and a pedestrian airbag. For example, the pedestrian protection device driver 643 may control the hood to be lifted up and the pedestrian airbag to be inflated, upon sensing collision with a pedestrian.

The lamp driving unit 650 may perform electronic control on various lamp devices in the vehicle 100.

The air conditioner driving unit 660 may perform electronic control on an air conditioner in the vehicle 100. For example, if a vehicle internal temperature is high, the air conditioner driver 660 may control the air conditioner to operate and supply cool air into the vehicle 100.

The vehicle driving device 600 may include a processor. Each unit of the vehicle driving device 600 may include a processor.

The vehicle driving device 600 may operate under control of the controller 170.

The operation system 700 is a system that controls various operations of the vehicle 100. The operation system 700 may operate in the autonomous driving mode.

The operation system 700 may include the traveling system 710, the park-out system 740, and the park-in system 750.

In some embodiments, the operation system 700 may further include a new component in addition to components described below or may not include a part of the described components.

The operation system 700 may include a processor. Each unit of the operation system 700 may include a processor.

In some embodiments, if the operation system 700 is implemented in software, the operation system 700 may lie under controller 170 in concept.

In some embodiments, the operation system 700 may conceptually include at least one of the UI device 200, the object detection device 300, the communication device 400, the vehicle driving device 600, or the controller 170.

The traveling system 710 may drive the vehicle 100.

The traveling system 710 may drive the vehicle 100 by providing a control signal to the vehicle driving device 600 based on navigation information received from the navigation system 770.

The traveling system 710 may drive the vehicle 100 by providing a control signal to the vehicle driving device 600 based on object information received from the object detection device 300.

The traveling system 710 may drive the vehicle 100 by receiving a signal from an external device through the communication device 400 and providing a control signal to the vehicle driving device 600.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 based on object information received from the object detection device 300.

The park-out system 740 may perform park-out of the vehicle 100 by receiving a signal from an external device through the communication device 400 and providing a control signal to the vehicle driving device 600.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 based on object information received from the object detection device 300.

The park-in system 750 may perform park-in of the vehicle 100 by providing a control signal to the vehicle driving device 600 according to a signal received from an external device via the communication device 400.

The navigation system 770 may provide navigation information. The navigation information may include at least one of map information, set destination information, route information based on setting of a destination, information about various objects on a route, lane information, or information about a current location of a vehicle.

The navigation system 770 may include a memory and a processor. The memory may store navigation information. The processor may control operation of the navigation system 770.

In some embodiments, the navigation system 770 may receive information from an external device via the communication device 400 and update pre-stored information with the received information.

In some embodiments, the navigation system 770 may be classified as a lower-level component of the UI device 200.

The sensing unit 120 may sense a vehicle state. The sensing unit 120 may include an attitude sensor (e.g., a yaw sensor, a roll sensor, or a pitch sensor), a collision sensor, a wheel sensor, a speed sensor, an inclination sensor, a weight detection sensor, a heading sensor, a yaw sensor, a gyro sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, a brake pedal position sensor, and so on.

The sensing unit 120 may acquire a sensing signal of vehicle position information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The interface unit 130 serves paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is conductibly connected to the interface unit 130, the interface unit 130 may supply electric energy received from the power supply 190 to the mobile terminal under control of the controller 170.

The memory 140 is conductibly connected to the controller 170. The memory 140 may store default data for a unit, control data for controlling the operation of the unit, and input and output data. The memory 140 may be any of various storage devices in hardware, such as read only memory (ROM), random access memory (RAM), erasable and programmable ROM (EPROM), flash drive, and hard drive. The memory 140 may store various data for an overall operation of the vehicle 100, such as programs for processing or control in the controller 170.

In some embodiments, the memory 140 may be integrated with the controller 170, or configured as a lower level component of the controller 170.

The controller 170 may control an overall operation of each unit in the vehicle 100. The controller 170 may be referred to as an electronic control unit (ECU).

The power supply 190 may supply power required for an operation of each component under control of the controller 170. In particular, the power supply 190 may receive power from a battery, etc. in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

In the following description, a vehicular camera may be referred to as a vehicular camera apparatus. In some embodiments, a vehicular camera apparatus including one image sensor may be referred to as a vehicular mono camera apparatus or a vehicular single camera apparatus. In some embodiments, a vehicular camera apparatus including two image sensors may be referred to as a vehicular stereo camera apparatus.

In the following description, a first direction may be a horizontal direction. The horizontal direction may refer to the width direction W defined based on the vehicle 100.

A second direction may be a vertical direction. The vertical direction may refer to the height direction H.

Figure 8A:
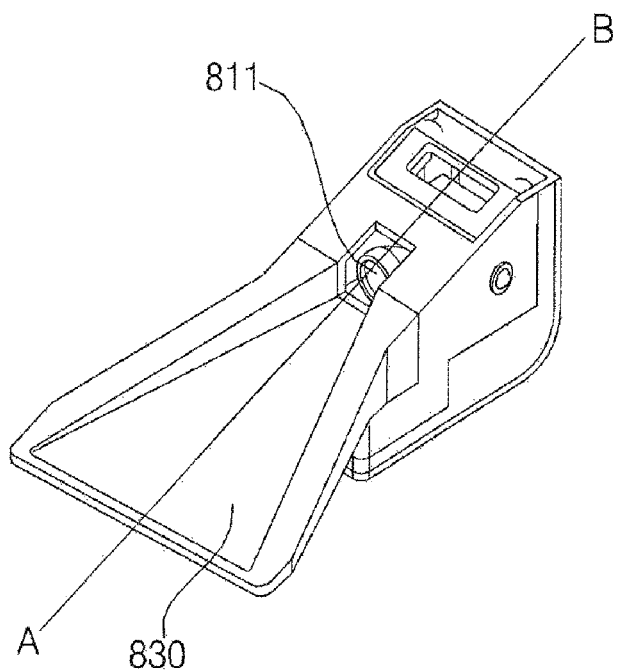
FIG. 8A is a perspective view of a vehicular camera according to an embodiment of the present invention.
Figure 8B:
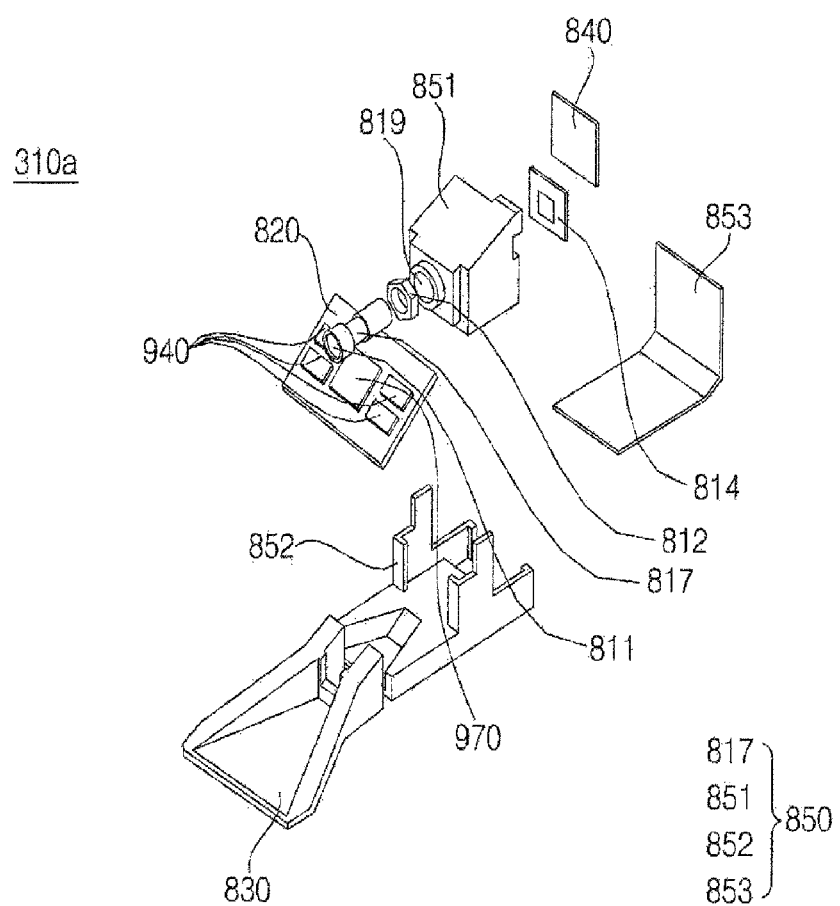
FIG. 8B is an exploded perspective view of a vehicular camera according to an embodiment of the present invention.
Figure 8C:
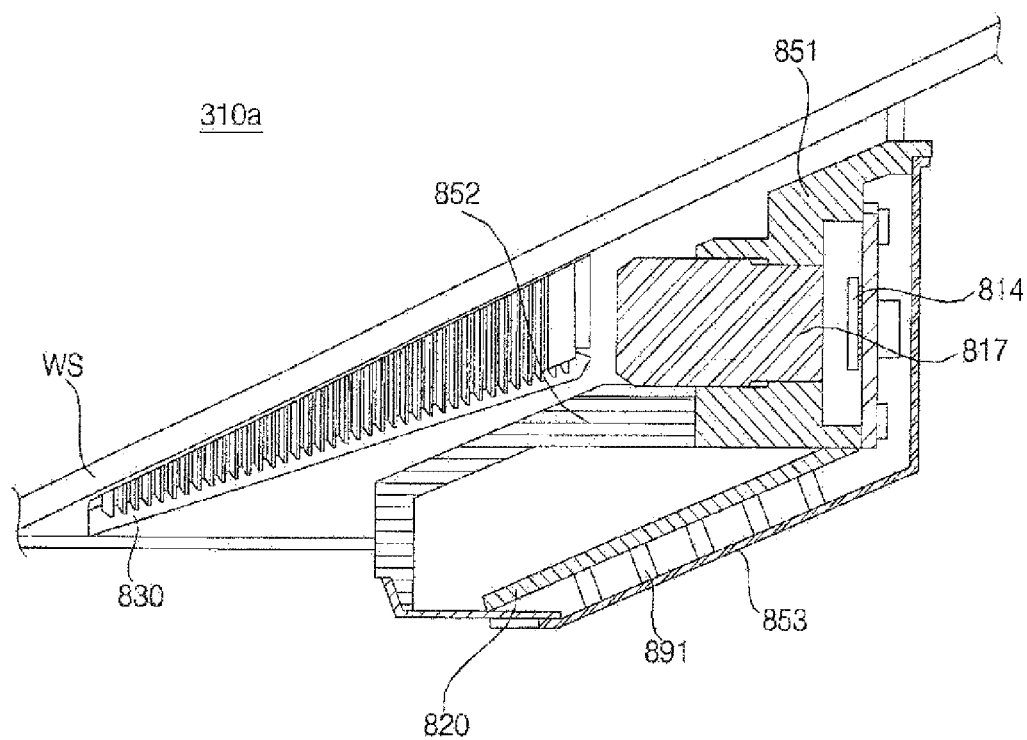
FIG. 8C is a side view of the vehicular camera taken along A-B of FIG. 8A according to an embodiment of the present invention.

FIG. 8A is a perspective view of a vehicular camera according to an embodiment of the present invention. FIG. 8B is an exploded perspective view of a vehicular camera according to an embodiment of the present invention. FIG. 8C is a side view of the vehicular camera taken along A-B of FIG. 8A according to an embodiment of the present invention.

The vehicular camera 310 described with reference to FIGS. 8A to 8C may be a single camera 310*a*.

The vehicular camera 310*a* may include a lens unit 811, an image sensor 814, and a processor 970.

In some embodiments, the vehicular camera 310*a* may separately and further include a processing board 820, a light shield 830, a heat dissipation member 840, and a housing 250 or may further include a combination thereof.

The housing 250 may include a first housing 851, a second housing 852, and a third housing 853.

The lens unit 811 may be coupled to the first housing 851 to be accommodated in a hole 819 formed in one portion of the first housing 851 through a nut 812 in a state in which the lens unit 811 is accommodated in a lens housing 817.

The image sensor 814 may include at least one photoelectric conversion device for converting an optical signal into an electrical signal. For example, the image sensor 814 may be a charge-coupled device (CCD) or a complimentary metal-oxide semiconductor (CMOS).

In order to acquire an external or internal image of a vehicle, the image sensor 814 may be positioned at an appropriate place outside or inside the vehicle.

For example, the image sensor 814 may be disposed adjacent to a front wind shield WS inside the vehicle in order to acquire a front image of the vehicle. In addition, the image sensor 814 may be disposed around a front bumper or a radiator grill.

For example, the image sensor 814 may be disposed adjacent to a rear wind shield inside the vehicle in order to acquire a rear image of the vehicle. Alternatively, the image sensor 814 may be disposed around a rear bumper, a trunk, or a tail gate.

For example, the image sensor 814 may be disposed adjacent to at least one of side windows inside the vehicle in order to acquire a lateral image of the vehicle. In addition, the image sensor 814 may be disposed around a side mirror, a side view mirror, a fender, or a door.

The image sensor 814 may be disposed at a rear end of the lens unit 811 in order to acquire an image based on light introduced through the lens unit 811. For example, the image sensor 814 may be disposed perpendicular to the ground in a state in which the image sensor 814 is spaced apart from the lens unit 811 by a predetermined distance.

A module including the lens unit 811 and the image sensor 814 may be referred to as an image acquisition module. The image acquisition module may be disposed at a ceiling of the vehicle 100. For example, the image acquisition module may be attached to the ceiling inside the vehicle 100 using a predetermined connection member between the image acquisition module and the ceiling. The image acquisition module may be disposed at the ceiling inside the vehicle 100, and thus, an external image of the vehicle 100 may be advantageously acquired at the highest location of the vehicle 100. That is, a visual field may be advantageously widened.

The processor 970 may be conductibly connected to the image sensor 814. The processor 970 may compute and process an image acquired through the image sensor 814. The processor 970 may control the image sensor 814.

The processor 970 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The processor 970 may be mounted on the processing board 820.

The processing board 820 may include a processor 270 and a memory 940.

The processing board 820 may be disposed to be inclined in a length direction. For example, a front or rear surface of the processing board 820 may be disposed to face the front wind shield WS. For example, the processing board 820 may be disposed in parallel to the front wind shield WS.

In general, the front wind shield WS included in the vehicle 100 may be formed to a roof from a bonnet of the vehicle 100 to be inclined at a predetermined angle based on the ground. In this case, the processing board 820 may be disposed to be inclined in the length direction, and thus, the vehicular camera 310a may be formed to be smaller than in the case in which the processing board 820 is disposed vertically or horizontally. The vehicular camera 310a may be formed to be small, and thus, a space may be further ensured in the vehicle 100 by as much as the reduced volume.

A plurality of devices or electronic components may be mounted on the processing board 820. In this case, heat may be generated due to the plurality of devices or electronic components included in the processing board 820.

The processing board 820 may be spaced apart from the image sensor 814. The processing board 820 may be spaced apart from the image sensor 814, and thus, heat generated from the processing board 820 may not cause a problem in terms of the performance of the image sensor 814.

The processing board 820 may be disposed at an optimum location in such a way that heat generated from the processing board 820 does not affect the image sensor 814. In detail, the processing board 820 may be disposed at a lower end of the image sensor 814. Alternatively, the processing board 820 may be disposed at a front end of the image sensor 814.

One or more memories 940 may be mounted on the processing board 820. The memory 940 may store an image acquired through the image sensor 814, various application data, data for control of the processor 970, or data processed by the processor 970. The memory 940 may be one of main devices that generate heat like the processor 970. In a state in which the processor 970 is disposed at the center of the processing board 820, the memory 940 may be disposed adjacent to the processor 970. For example, one or more memories 940 may be disposed to surround the processor 970 that is disposed at the center thereof. In this case, the processor 970 and the memory 940, which are devices generating heat, may be disposed farthest from the image sensor 814.

The processor 970 may be conductibly connected to the controller 170. The processor 970 may be controlled by the controller 170.

The light shield 830 may be disposed at a front end of the lens unit 811. The light shield 830 may block light, which is not required to acquire an image, from being introduced into the lens unit 811. For example, the light shield 830 may block light that is reflected from the wind shield WS, a vehicular dashboard, or the like. The light shield 830 may block light generated from an unnecessary light source.

The light shield 830 may have a fence structure. For example, the light shield 830 may have a lower fence structure.

A shape of the light shield 830 may be changed depending on a vehicle type. For example, a curvature of a wind shield and an angle between the wind shield and the ground may be changed depending on a vehicle type, and thus, the light shield 830 may have a shape corresponding to a type of a vehicle in which the vehicular camera 310a is installed. To this end, the light shield 830 may have a detachable structure.

The heat dissipation member 840 may be disposed at a rear end of the image sensor 814. The heat dissipation member 840 may contact the image sensor 814 or an image sensor board on which the image sensor 814 is mounted. The heat dissipation member 840 may process heat of the image sensor 814.

As described above, the image sensor 814 may be sensitive to heat. The heat dissipation member 840 may be disposed between the image sensor 814 and the third housing 853. The heat dissipation member 840 may be disposed to contact the image sensor 814 and the third housing 853. In this case, the heat dissipation member 840 may discharge heat through the third housing 853.

For example, the heat dissipation member 840 may be any one of a thermal pad and thermal grease.

The housing 250 may form an outer appearance of a vehicular camera apparatus 310. The housing 250 may accommodate each of the vehicular camera apparatus therein. The housing 250 may accommodate the lens unit 811, the image sensor 814, and the processing board 820 therein.

The housing 250 may include the lens housing 817, the first housing 851, the second housing 852, and the third housing 853.

The lens housing 817 may accommodate at least one lens unit 811 and may protect the lens unit 811 from external shocks.

The first housing 851 may be formed to surround the image sensor 814. The first housing 851 may include the hole 819. The lens unit 811 may be connected to the image sensor 814 in a state in which the lens unit 811 is housed in the lens housing and is accommodated in the hole 819.

The first housing 851 may be formed with a thickness that is increased toward the image sensor 814. For example, the first housing 851 may be formed using a die casting method. In this case, in order to prevent degradation of performance of the image sensor 814 due to heat, the first housing 851 may be formed with a larger thickness in a portion adjacent to the image sensor 814 than other portions.

The first housing 851 may be formed with a larger thickness than the third housing 853. When the housing is thick, heat may be slowly transferred. Accordingly, when the thickness of the first housing 851 is greater than the thickness of the third housing 853, heat generated inside the vehicular camera 310a may be advantageously discharged to the outside through the third housing 853 rather than the first housing 851 that is disposed adjacent to the front wind shield WS and is difficult to dissipate heat.

In some embodiments, the lens housing 817 and the first housing 851 may be integrated into each other.

The second housing 852 may be positioned at a front end of the processing board 820. The second housing 852 may be coupled to the first housing 851 and the third housing 853 through a predetermined coupling device.

The second housing 852 may include an attachment device through which the light shield 830 is attached to the second housing 852. The light shield 830 may be attached to the second housing 852 through the attachment device.

The first and second housings 851 and 852 may be formed of a synthetic resin material.

The third housing 853 may be coupled to the first housing 851 and the second housing 852 through a predetermined coupling device. In some embodiments, the first to third housings 851, 852, and 853 may be formed to be integrated into each other.

The third housing 853 may be formed to surround the processing board 820. The third housing 853 may be positioned at a rear or lower end of the processing board 820. The third housing 853 may be formed of a heat conductive material. For example, the third housing 853 may be formed of metal such as aluminum. The third housing 853 may be formed of a heat conductive material, and thus, heat may be effectively discharged.

When the first and second housings 851 and 852 are formed of a synthetic resin material and the third housing 853 is formed of a heat conductive material, heat inside the vehicular camera may be discharged to the third housing 853 rather than the first and second housings 851 and 852. That is, when the vehicular camera 310a is installed at a wind shield, the first and second housings 851 and 852 may be positioned adjacent to the wind shield, and thus, heat is not capable of being discharged through the first and second housings 851 and 852. In this case, heat may be effectively discharged through the third housing 853.

When the third housing 853 is formed of aluminum (Al), it may be advantageous to protect components (e.g., the image sensor 814 and the processor 970) positioned inside the third housing 853 from electro-magnetic compatibility (EMC) and electrostatic discharge (ESC).

The third housing 853 may contact the processing board 820. In this case, the third housing 853 may effectively discharge heat through the portion that contacts the processing board 820.

The third housing 853 may further include a heat dissipation unit 891. For example, the heat dissipation unit 891 may include at least one of a heat sink, a heat dissipation fin, a thermal pad, and thermal grease.

The heat dissipation unit 891 may discharge heat generated inside the vehicular camera 310a to the outside. For example, the heat dissipation unit 891 may be positioned between the processing board 820 and the third housing 853. The heat dissipation unit 891 may contact the processing board 820 and the third housing 853 and may discharge heat generated from the processing board 820 to the outside.

The third housing 853 may further include an air outlet hole. The air outlet hole may be a hole for discharging high-temperature air inside the vehicular camera 310a to the outside of the vehicular camera 310a. An air flowing unit connected to the air outlet hole may be included in the vehicular camera 310a. The air flowing unit may guide high-temperature air inside the vehicular camera 310a to the air outlet hole.

The vehicular camera 310a may further include a dampproof unit. The dampproof unit may be configured in the form of a patch and may be attached to an air outlet hole. The dampproof unit may be a dampproof member formed of a gore-tex material. The dampproof unit may discharge moisture inside the vehicular camera 310a to the outside. The dampproof unit may prevent moisture outside the vehicular camera 310a from being introduced into the vehicular camera 310a.

Figure 9A:
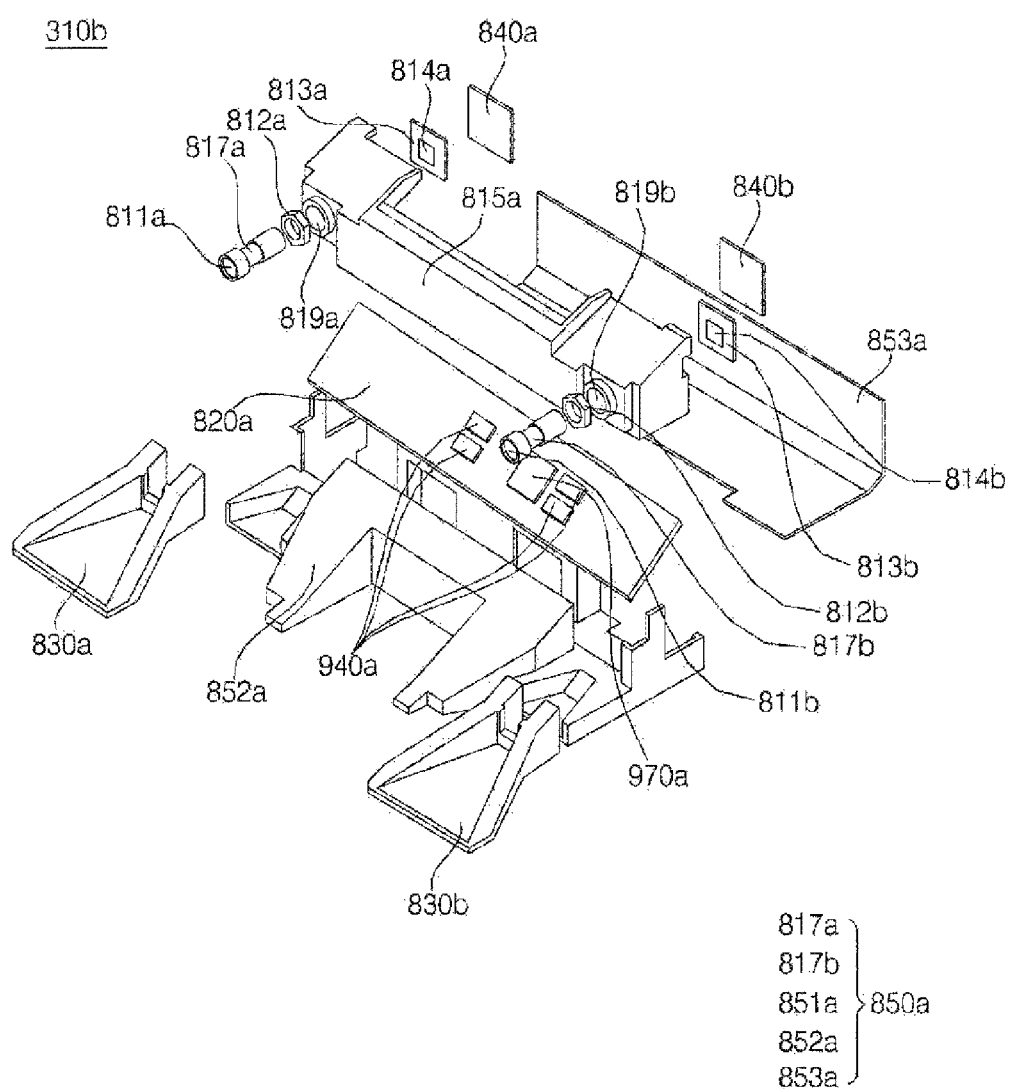
FIG. 9A is a perspective view of a vehicular camera according to an embodiment of the present invention.
Figure 9B:
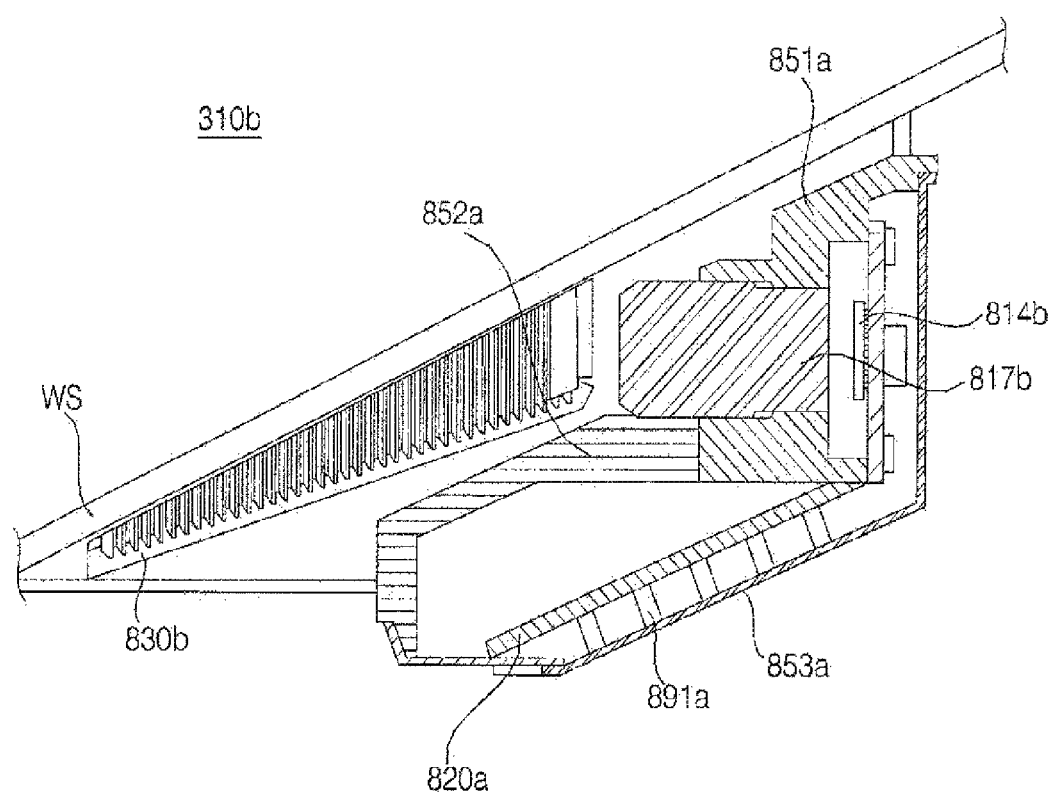
FIG. 9B is an exploded perspective view of a vehicular camera according to an embodiment of the present invention.
Figure 9C:
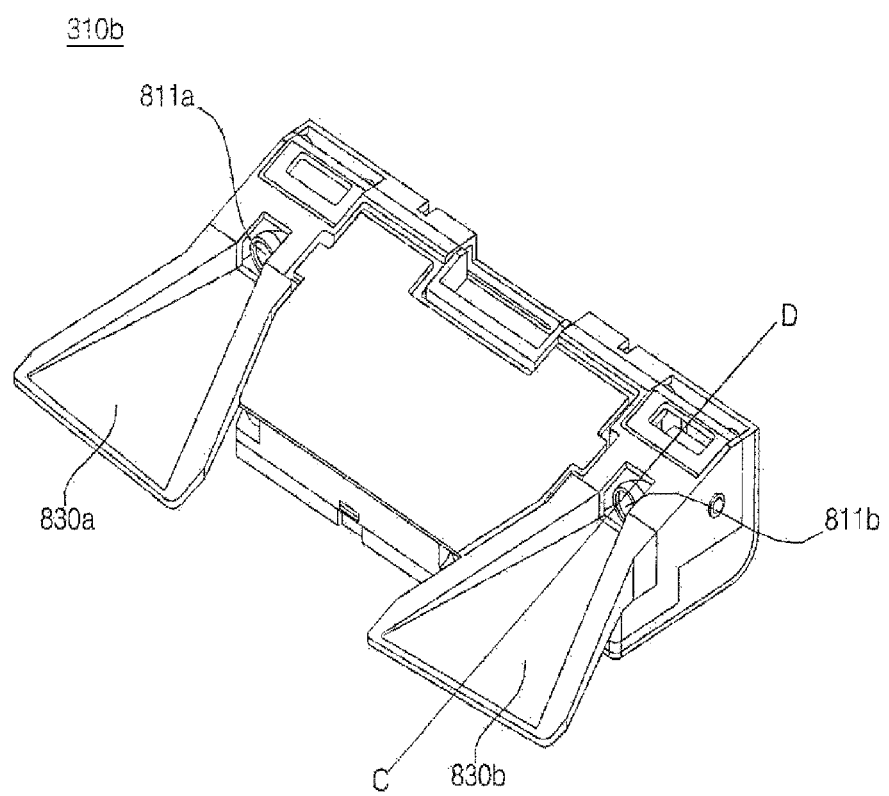
FIG. 9C is a side view of the vehicular camera taken along C-D of FIG. 9A according to an embodiment of the present invention.

FIG. 9A is a perspective view of a vehicular camera according to an embodiment of the present invention. FIG. 9B is an exploded perspective view of a vehicular camera according to an embodiment of the present invention. FIG. 9C is a side view of the vehicular camera taken along C-D of FIG. 9A according to an embodiment of the present invention. The vehicular camera 310 described with reference to FIGS. 9A and 9B may be a stereo camera 310b.

Any description of the single camera 310a described with reference to FIGS. 8A to 8C may be applied to the stereo camera 310b. That is, each of the first and second cameras included in the stereo camera 310b may be the camera described with reference to FIGS. 8A to 8C.

The stereo camera 310b may include the lens unit 811a, a second lens unit 811b, a first image sensor 814a, a second image sensor 814b, and a processor 970a.

In some embodiments, the vehicular camera 310b may separately and further include a processing board 820a, a first light shield 830a, a second light shield 830b, and a housing 250a or may further include a combination thereof.

The housing may include a first lens housing 817a, a second lens housing 817b, a first housing 851a, a second housing 852a, and a third housing 853a.

The description of the lens unit 811 of FIGS. 8A to 8C may be applied to the lens unit 811a and the second lens unit 811b.

The description of the image sensor 814 of FIGS. 8A to 8C may be applied to the first image sensor 814a and the second image sensor 814b.

A module including the lens unit 811a and the first image sensor 814a may be referred to a first image acquisition module. A module including the second lens unit 811b and the second image sensor 814b may be referred to a second image acquisition module.

The processor 970a may be conductibly connected to the first image sensor 814a and the second image sensor 814b. The processor 970 may compute and process images acquired through the first image sensor 814a and the second image sensor 814b. In this case, the processor 970 may form a disparity or may perform disparity calculation based on the images acquired through the first image sensor 814a and the second image sensor 814b.

The processor 970a may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The processor 970a may be mounted on the processing board 820a.

The description of the processing board 820 of FIGS. 8A to 8C may be applied to the processing board 820a.

The description of the light shield 830 of FIGS. 8A to 8C may be applied to the first light shield 830a and the second light shield 830b.

The description of the lens housing 817 of FIGS. 8A to 8C may be applied to the first lens housing 817a and the second lens housing 817b.

The description of the first housing 851 of FIGS. 8A to 8C may be applied to the first housing 851a.

The description of the second housing 852 of FIGS. 8A to 8C may be applied to the second housing 852a.

The description of the third housing 853 of FIGS. 8A to 8C may be applied to the third housing 853a.

Figure 10:
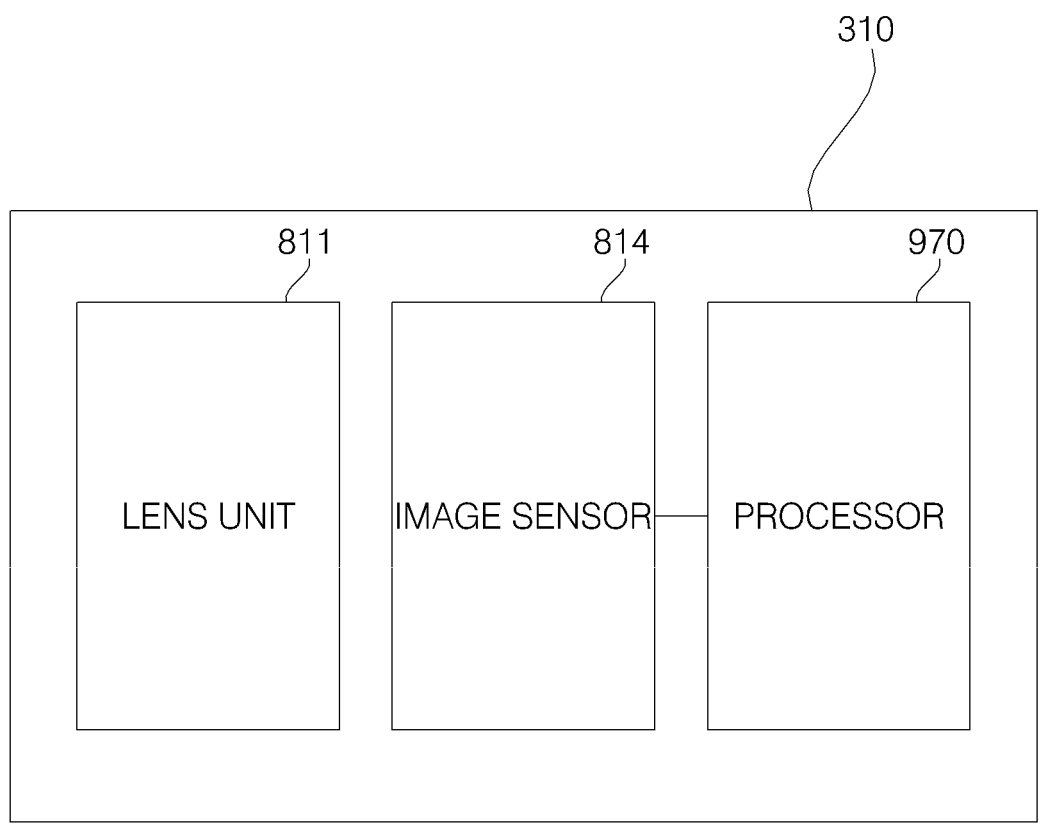
FIG. 10 is a diagram showing a concept of main components of a vehicular camera apparatus according to an embodiment of the present invention.

FIG. 10 is a diagram showing a concept of main components of a vehicular camera apparatus according to an embodiment of the present invention.

Referring to FIG. 10, the vehicular camera apparatus 310 may include the image sensor 814, the processor 970, and the lens unit 811.

The image sensor 814 may include at least one photoelectric conversion device for converting an optical signal into an electrical signal, such as a charge-coupled device (CCD) or a complimentary metal-oxide semiconductor (CMOS).

The image sensor 814 may include a plurality of pixels. For example, each of the plurality of pixels may include a photo diode and a transistor.

The image sensor 814 may include a first pixel group and a second pixel group.

The first pixel group may correspond to a first region of an image acquired by the image sensor 814.

The second pixel group may correspond to a second region of the image acquired by the image sensor 814.

The first pixel group may have first pixel density. The second pixel group may have second pixel density. The first pixel density may be greater than the second pixel density.

In order to accurately detect an object at a long distance or a middle distance, the first pixel density of the first pixel group corresponding to the first region needs to be greater than the second pixel density of the second pixel group corresponding to the second region.

Pixel density may be defined as a pixel per unit field of view (FOV). Alternatively, pixel density may be defined as a pixel per unit area of the image sensor 814.

The first region may be a region for detecting an object at a middle distance or a long distance. The second region may be a region for detecting an object at a short distance.

The second pixel group may have pixel density that is gradually reduced away from the center of the image sensor 814 in a first direction.

The second pixel group may correspond to the first region for detecting an object a short distance. In order to detect an object at a short distance, smaller pixel density may be required than in the case of an object is detected at a long distance or a middle distance. The importance of an object may be lowered away from the vehicle 100 because influence of the object on the vehicle 100 is lowered away from the vehicle 100. Accordingly, in the case of the second pixel group, manufacturing costs of the image sensor 814 and the sizes of the image sensor 814 and the lens unit 811 may be advantageously reduced while object detection efficiency is maintained, by gradually reducing pixel density away from the center of the image sensor 814 in the first direction.

Pixel density of the first pixel group in the second direction may be constant.

Pixel density of the second pixel group in the second direction may be constant.

Pixel density of the first pixel group and the second pixel group in a vertical direction may be constant.

The processor 970 may classify an image acquired through the image sensor 814 into a first field of view (FOV) range in the first direction and a second FOV range in the first direction.

The first field of view (FOV) range may refer to a range from a predetermined angle (−) in a left direction and a predetermined angle (+) in a right direction based on an imaginary line that extends in a heading direction of the vehicle 100 from the center of the width of the vehicle 100 in the first direction.

The processor 970 may detect an object positioned at a long distance or a middle distance within the first FOV range.

The processor 970 may process the first region corresponding to the first FOV range from an image.

The second FOV range may refer to a range having a predetermined angle outside the first FOV range in left and right directions, in the first direction.

The processor 970 may detect an object positioned at a short distance within the second FOV range.

The processor 970 may process the second region corresponding to the second FOV range from an image.

The processor 970 may separately process the first region and the second region.

The processor 970 may separately preprocess the first region and the second region.

The processor 970 may separate the first region and the second region and may perform noise reduction, rectification, calibration, color enhancement, color space conversion (CSC), interpolation, camera gain control, or the like on an image The processor 970 may separate the first region and the second region and may perform segment and clustering on at least one image.

For example, the processor 970 may separate a background and a foreground with respect to at least one image based on a feature point.

The processor 970 may separate the first region and the second region and may detect an object.

For example, the processor 970 may detect an object with respect to at least one image based on the feature point.

For example, the processor 970 may detect a first object from the first region. The processor 970 may determine the size of the first object based on a pixel number corresponding to the first object in the first region.

For example, the processor 970 may detect a second object from the second region. The processor 970 may determine the size of the second object based on a pixel number corresponding to the second object in the second region.

The processor 970 may determine the size of the first object based on a first ratio. The processor 970 may determine the size of the second object based on a second ratio different from the first ratio.

The first pixel density of the first pixel group of the image sensor 814, which corresponds to the first region, and the second pixel density of the second pixel group of the image sensor 814, which corresponds to the second region, may be different from each other.

Even if objects have the same size, a size of an image acquired by the first pixel group and a size of an image acquired by the second pixel group may be different from each other. The processor 970 may separate the first region and the second region, may detect an object, and may determine the size of the object according to different ratios.

The processor 970 may separate the first region and the second region and may classify and verify the separated object.

For example, the processor 970 may use an identification scheme using a neural network, a support vector machine (SVM) scheme, a identification scheme based on AdaBoost using Haar-like feature, a histograms of oriented gradients (HOG) scheme, or the like.

The processor 970 may compare information stored in the memory 940 with feature points of detected objects to verify the object.

The processor 970 may separate the first region and the second region and may track the verified object.

For example, the processor 970 may separate the first region and the second region, may verify an object in images that are sequentially acquired, may compute motion of the verified object or a motion vector, and may track motion of the corresponding object, or the like based on the calculated motion or motion vector.

The lens unit 811 may change a path of light that is introduced into the image sensor 814 from the outside.

Figure 16:
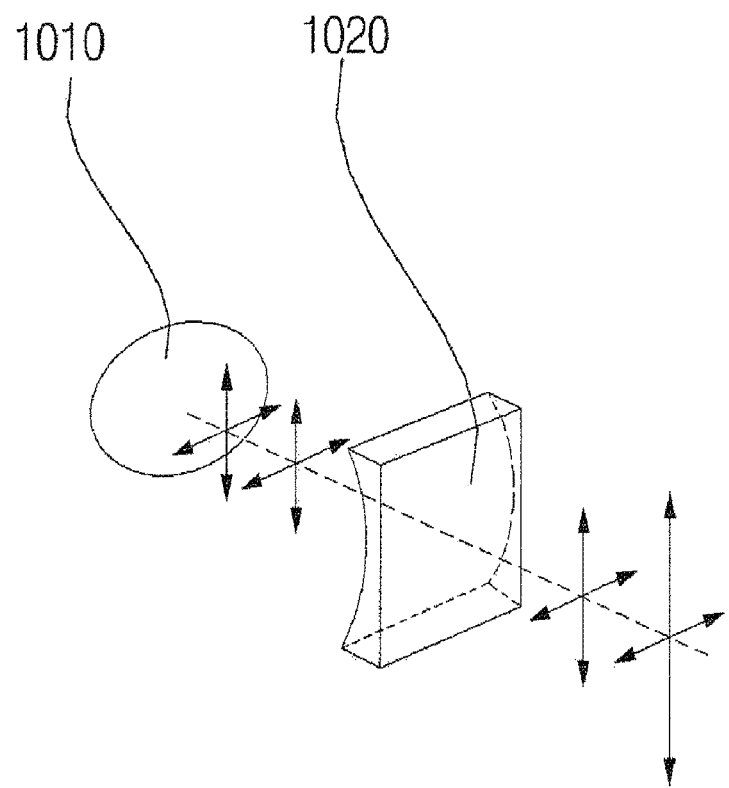
FIGS. 16 and 17 are diagrams for explanation of a lens unit according to an embodiment of the present invention.
Figure 17:
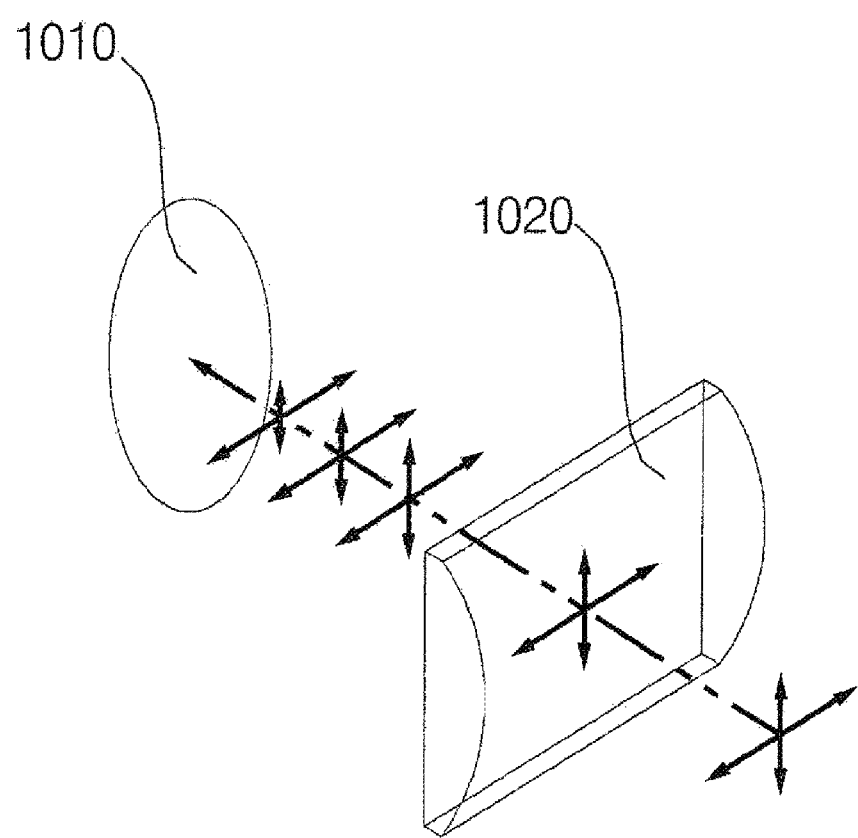

The lens unit 811 may include a base lens 1010 (refer to FIGS. 16 and 17) and an anamorphic lens 1020 (refer to FIGS. 16 and 17).

A focal distance of the lens unit 811 in the first direction may be determined by a focal distance of the base lens 1010 in the first direction and a focal distance of the anamorphic lens 1020 in the first direction.

A focal distance of the lens unit 811 in the second direction may be determined by a focal distance of the base lens 1010 in the second direction.

The base lens 1010 may be a lens, a focal distance in the first direction of which is the same as a focal distance in the second direction.

The anamorphic lens 1020 may be a lens, a focal distance in the first direction of which is different from a focal distance in the second direction.

For example, the anamorphic lens 1020 may have a focal distance in the first direction, which is smaller than a focal distance in the second direction. Here, the first direction may be a horizontal direction (e.g., a width direction) and the second direction may be a vertical direction (e.g., a height direction).

For example, the anamorphic lens 1020 may include at least one of a cylindrical lens, a toric lens, and a prism lens.

For example, the anamorphic lens 1020 may have negative (−) refractive power in the first direction. In this case, the anamorphic lens 1020 may have no refractive power in the second direction.

For example, the anamorphic lens 1020 may have positive (+) refractive power in the first direction. In this case, the anamorphic lens 1020 may have no refractive power in the second direction.

Because the anamorphic lens 1020 has refractive power in the first direction, the focal distance of the lens unit 811 in the first direction may be determined by the focal distance of the base lens 1010 in the first direction and the focal distance of the anamorphic lens 1020 in the first direction.

Because the anamorphic lens 1020 has no refractive power in the second direction, the focal distance of the lens unit 811 in the second direction may be determined by the focal distance of the base lens 1010 in the second direction.

A FOV in the second direction in the first FOV range and a FOV in the second direction in the second FOV range may be the same.

That is, a FOV in a vertical direction may not be divided in the first FOV range and the second FOV range in a horizontal direction and may be constant.

The vehicular camera apparatus according to an embodiment of the present invention may be the vehicular stereo camera apparatus 310*b*.

The description of the vehicular camera apparatus 310 described in the specification may be applied to the vehicular stereo camera apparatus 310*b* except that the vehicular stereo camera apparatus 310*b* includes two cameras.

The vehicular stereo camera apparatus 310*b* may include a first camera and a second camera.

The first camera may include the first image sensor 814*a* and the processor 970.

The processor 970 may divide a first image acquired through the first image sensor 814*a* into the first FOV range in the first direction and the second FOV range in the first direction.

The processor 970 may process the first region corresponding to the first FOV range in the first image.

The processor 970 may process the second region corresponding to the second FOV range in the first image.

The processor 970 may separately process the first region and the second region.

The second camera may include the second image sensor 814*b*.

The processor 970 may a second image acquired through the second image sensor 814*b* into the first FOV range in the first direction and the second FOV range in the first direction.

The processor 970 may process a third region corresponding to the first FOV range in the second image.

The processor 970 may process a fourth region corresponding to the second FOV range in the second image.

The processor 970 may separately process the third region and the fourth region.

The processor 970 may acquire disparity information based on the first image and the second image.

For example, the processor 970 may perform stereo matching based on the first image and the second image and may acquire a disparity map based on stereo matching. The processor 970 may acquire disparity information based on the disparity map.

The processor 970 may separate regions of the first and second images to acquire disparity information.

The processor 970 may acquire disparity information based on the first region in the first image and the third region in the second image. In this case, the processor 970 may acquire distance information and relative speed information of an object positioned at a long distance or middle distance based on the disparity information.

The processor 970 may acquire disparity information based on the second region in the first image and the fourth region in the second image. In this case, the processor 970 may acquire distance information and relative speed information of an object positioned at a short distance based on the disparity information.

Figure 11:
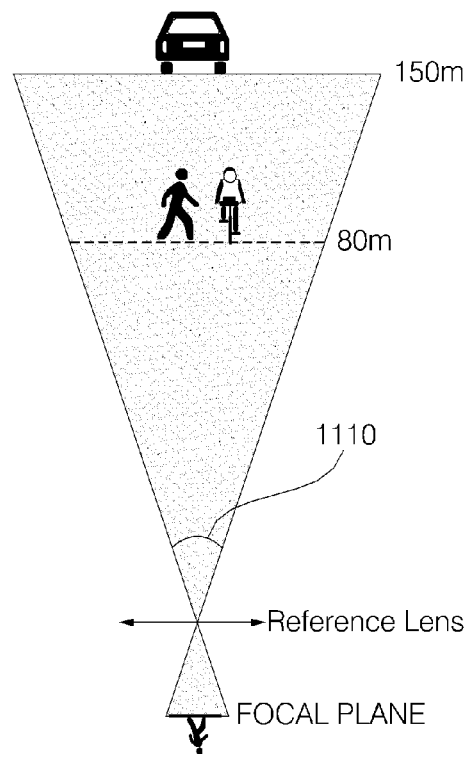
FIG. 11 is a diagram for explanation of a vehicular camera according to a conventional art.

FIG. 11 is a diagram for explanation of a vehicular camera according to a conventional art.

Referring to FIG. 11, in general, the vehicular camera according to the conventional art has an FOV range 1110 between 60 and 70 degrees in a horizontal direction and has an FOV range between 35 and 45 degrees in a vertical direction. 1920 pixels are present in the horizontal direction and 1080 pixels are present in the vertical direction. An image sensor has a size of 5.76 mm in the horizontal direction and 3.24 mm in the vertical direction. A focal distance is 4.52 mm. An image circle is 6.6 mmΦ.

With regard to the vehicular camera according to the conventional art, a horizontal FOV, a pixel, a sensor size, a focal distance, and so on may be set according to detection of an object position at a middle distance or a long distance.

For example, the middle distance may be in the range of 80 m to 150 m.

The vehicular camera according to the conventional art has a problem in that it is difficult to detect an object positioned at a short distance within 50 m.

That is, there is a problem in that every object positioned at a short distance and a middle distance is not detected through one camera.

The vehicular camera apparatus 310 according to an embodiment of the present invention may divide an image acquired through one image sensor based on an FOV range and may separately process the divided images in order to overcome this problem.

FIGS. 12 to 16 are diagrams for explanation of a vehicular camera apparatus according to an embodiment of the present invention.

Figure 12:
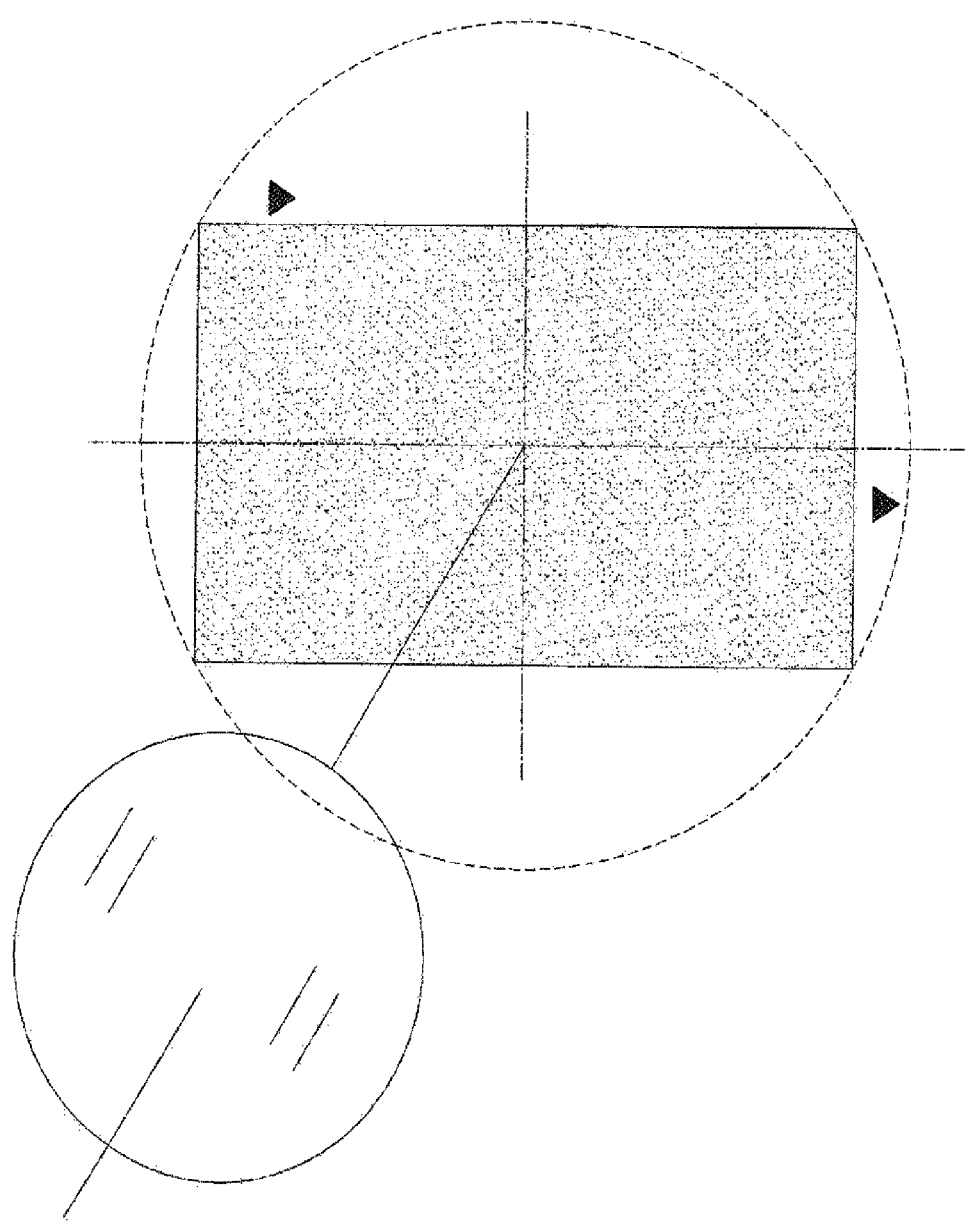
FIGS. 12 to 15 are diagrams for explanation of a vehicular camera apparatus according to an embodiment of the present invention.
Figure 13:

FIGS. 12 and 13 are diagrams for explanation of a method of magnifying an FOV for recognition of a short distance.

In order to detect an object positioned at a short distance, an FOV needs to be magnified. In order to magnify an FOV, an image sensor that has the same focal distance as a lens included in the vehicular camera of FIG. 11 and is larger than the image sensor of FIG. 11 may be used. In this case, the vehicular camera may approximately have an FOV range between 90 and 100 degrees in the horizontal direction and may approximately have an FOV range between 60 and 70 degrees in the vertical direction. 3289 pixels may be present in the horizontal direction and 1849 pixels may be present in the vertical direction. An image circle may be increased to 11.3 mmΦ.

In this case, as the size of an image sensor is increased, manufacturing costs of the image sensor may be increased. In addition, a large lens as possible needs to be used, and thus, the entire size and weight of the vehicular camera apparatus are increased and a problem occurs when the vehicular camera apparatus is installed at a wind shield of the vehicle 100. In the case of the vehicular camera apparatus, in order to recognize an object at a short distance, the number of pixels is increased even if it is not required to magnify an FOV in the vertical direction.

Accordingly, as described with reference to FIG. 14, it may be required to magnify an FOV only in the horizontal direction.

Figure 14:
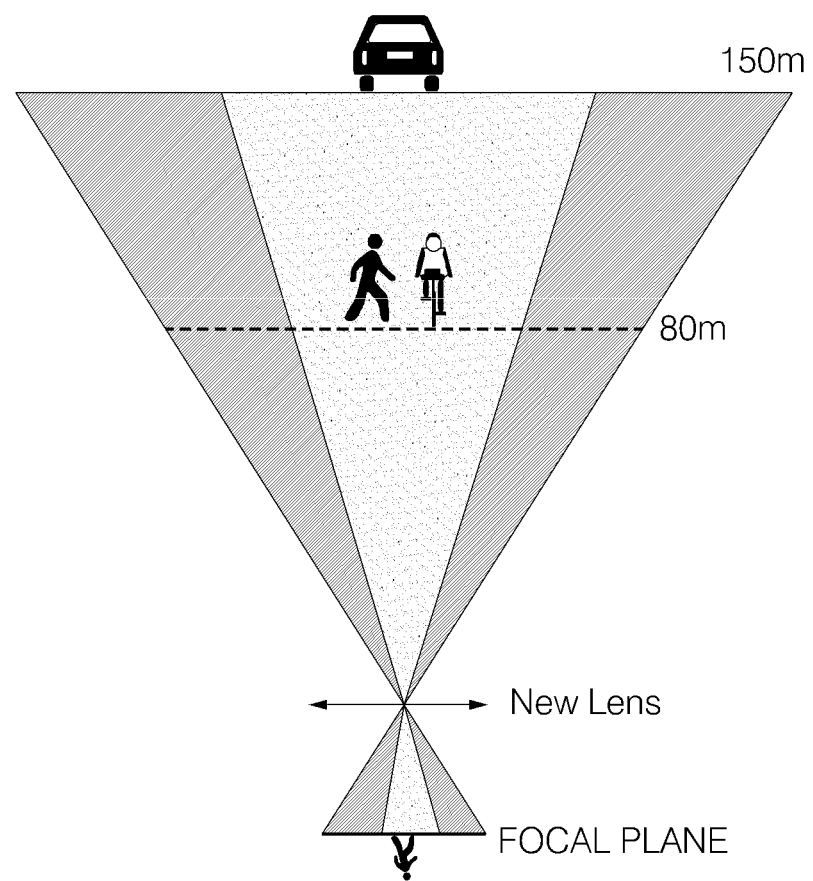

FIG. 14 is a diagram for explanation of a method of magnifying an FOV only in a horizontal direction.

In order to detect an object positioned at a short distance, an FOV may be magnified only in the horizontal direction. In this case, an image sensor and a lens, sizes and pixel numbers of which are increased only in the horizontal direction while the focal distance of the vehicular camera of FIG. 11 is maintained may be applied. In this case, the vehicular camera may approximately have an FOV range between 90 and 100 degrees in the horizontal direction and may approximately have an FOV range between 35 and 45 degrees in the vertical direction. 3289 pixels may be present in the horizontal direction and 1080 pixels may be present in the vertical direction. The image sensor may have a size of 9.87 mm in the horizontal direction and a size of 3.24 mm in the vertical direction. A focal distance may be 4.52 mm. An image circle may be 10.4 mmΦ.

As such, when an FOV is magnified only in the horizontal direction, only recognition at a short distance is needed at a surrounding portion of a horizontal FOV, and thus, it may be required to further reduce the size of a sensor and to reduce the number of pixels.

Figure 15:
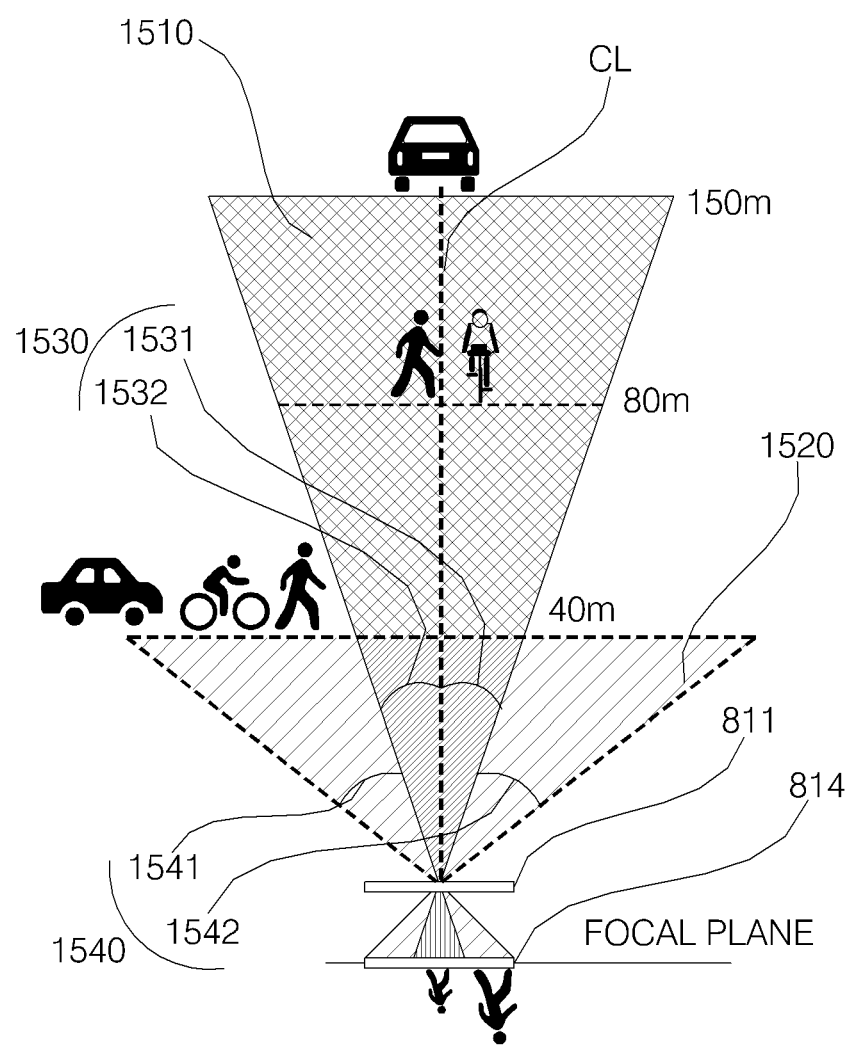

FIG. 15 is a diagram for explanation of a vehicular camera apparatus according to an embodiment of the present invention.

Referring to the drawing, the processor 970 may divide an image acquired through the image sensor 814 into a first FOV range 1530 in the first direction and a second FOV range 1540 in the first direction.

The first FOV range 1530 may be an FOV range for recognition at a long distance or a middle distance 1510.

The first FOV range 1530 may refer to a range to a predetermined angle 1532 in a right direction from a predetermined angle 1531 in a left direction based on an imaginary line CL that extends in a heading direction of the vehicle 100 from the center of the width of the vehicle 100.

The second FOV range 1540 may an FOV range for recognition of a short distance 1520.

The second FOV range 1540 may refer to a range having a predetermined angle 1541 in a left direction of a first FOV 1530 and a predetermined angle 1542 in a right direction of the first FOV 1530, based on the first direction.

The processor 970 may process the first region corresponding to the first FOV range in an image. The processor 970 may process the second region corresponding to the second FOV range in an image. In this case, the processor 970 may separately process the first region and the second region.

A short distance recognition region and a long distance recognition region may be separated, and magnification at a recognition reference distance in each corresponding case, a target value of lens distortion, and an image sensor size and a pixel number for applying a recognition algorithm used in the vehicular camera of FIG. 11 may be derived from an experimental value.

For example, in consideration of lens distortion of 17%, a pixel number in an optimum horizontal direction may be 2800 and a pixel number in a vertical direction may be 1080. In this case, an image sensor may have a size of 8.4 mm in a horizontal direction. In this case, an FOV in the first direction may be 85.8 degrees. Here, lens distortion of 17% may be a threshold value of a lens distortion value allowed to detect an object from an image by a vehicular camera.

FIGS. 16 and 17 are diagrams for explanation of a lens unit according to an embodiment of the present invention.

The lens unit 811 may change a path of light introduced to the image sensor 814 from the outside.

The lens unit 811 may include the base lens 1010 and the anamorphic lens 1020.

The base lens 1010 may be a lens, a focal distance in the first direction of which is the same as a focal distance in the second direction. In some embodiments, the base lens 1010 may be configured by coupling a plurality of lenses.

The anamorphic lens 1020 may be a lens, a focal distance in the first direction of which is different from a focal distance in the second direction.

The anamorphic lens 1020 may be configured to magnify an FOV in the horizontal direction.

In order to detect an object in the short distance recognition region, a wider FOV may be required than the long distance recognition region. The vehicular camera apparatus 310 according to an embodiment of the present invention needs to detect an object both in the long distance recognition region and the short distance recognition region. The anamorphic lens 1020 may be configured to magnify an FOV in the horizontal direction and to maintain an FOV in the vertical direction.

As the anamorphic lens 1020, at least one of a cylindrical lens, a toric lens, and a prism lens may be used.

Because the anamorphic lens 1020 is used, the lens unit 811 may have a smaller focal distance in the horizontal direction than a focal distance in the vertical direction.

The anamorphic lens 1020 may be configured not to change the focal distance in the vertical direction, and thus, the FOV in the vertical direction of the lens unit 811 may be constant.

As exemplified in FIG. 16, the anamorphic lens 1020 may have negative (−) refractive power in the first direction.

In detail, when a focal distance of the base lens 1010 is equal to or greater than a reference focal distance, the anamorphic lens 1020 may have negative (−) refractive power in the first direction. Here, the reference focal distance may be a focal distance of a lens of the vehicular camera of FIG. 11. The reference focal distance may be determined via an experiment.

As exemplified in FIG. 17, the anamorphic lens 1020 may have positive (+) refractive power in the second direction.

In detail, when a focal distance of the base lens 1010 is smaller than the reference focal distance, the anamorphic lens 1020 may have positive (+) refractive power in the first direction. Here, the reference focal distance may be a focal distance of a lens of the vehicular camera of FIG. 11. The reference focal distance may be determined via an experiment.

Figure 18:
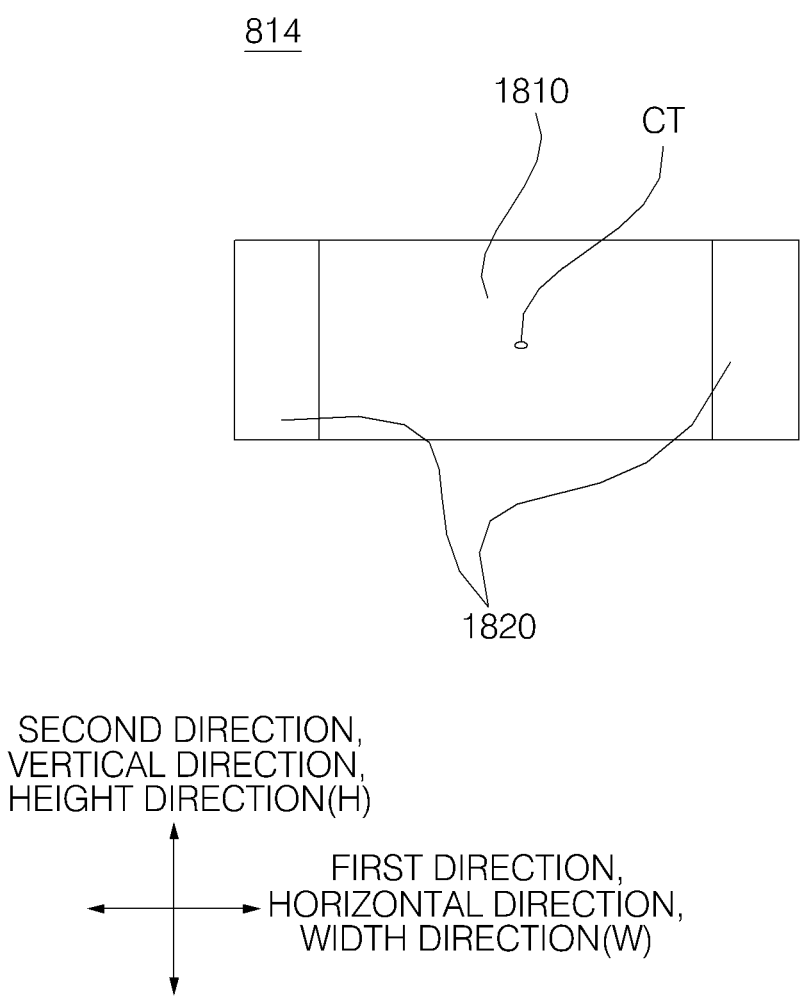
FIG. 18 is a diagram for explanation of an image sensor according to an embodiment of the present invention.

FIG. 18 is a diagram for explanation of an image sensor according to an embodiment of the present invention.

The image sensor 814 may include a first pixel group 1810 and a second pixel group 1820.

The first pixel group 1810 may correspond to a first region of an image acquired by the image sensor 814. The first region of the image may be formed by converting an optical signal into an electrical signal by a photo diode included in the first pixel group 1810.

The second pixel group 1820 may correspond to the second region of the image acquired by the image sensor 814. The second region of the image may be formed by converting an optical signal into an electrical signal by a photo diode included in the second pixel group 1820.

The first pixel group 1810 may have first pixel density. The second pixel group 1820 may have second pixel density. The first pixel density may be greater than the second pixel density.

The second pixel group 1820 may have pixel density that is gradually reduced away from the center CT of the image sensor 814 in the first direction. The second pixel group 1820 may have pixel density that is gradually reduced toward the outside of the image sensor 814.

Pixel density of the first pixel group 1810 in the second direction may be constant.

Pixel density of the second pixel group 1820 in the second direction may be constant.

The present invention may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller. The above embodiments are therefore to be construed in all aspects as illustrative and not restrictive. The scope of the present invention should be determined by the appended claims and their legal equivalents, not by the above description, and all changes coming within the meaning and equivalency range of the appended claims are intended to be embraced therein.

What is claimed is:

1. A vehicular camera apparatus comprising:
    an image sensor; and
    a processor configured to divide an image acquired through the image sensor into a first field of view (FOV) range in a first direction and a second FOV range in the first direction, to process a first region corresponding to the first FOV range in the image, to process a second region corresponding to the second FOV range in the image, and to separately process the first region and the second region,
    wherein the image sensor includes:
        a first pixel group corresponding to the first region and having a first pixel density, and
        a second pixel group corresponding to the second region and having a second pixel density that is less than the first pixel density and that decreases in a direction away from a center of the image sensor along the first direction, and
    wherein each of the first pixel group and the second pixel group has a pixel density that is constant in a second direction different from the first direction.

2. The vehicular camera apparatus of claim 1, further comprising a lens unit configured to change a path of light introduced to the image sensor from an outside of the lens unit.

3. The vehicular camera apparatus of claim 2, wherein the lens unit includes an anamorphic lens having a focal distance in the first direction and a focal distance in the second direction that is different from the focal distance in the first direction of the anamorphic lens.

4. The vehicular camera apparatus of claim 3, wherein the anamorphic lens has the focal distance in the first direction that is smaller than the focal distance in the second direction.

5. The vehicular camera apparatus of claim 3, wherein the first direction is a horizontal direction and the second direction is a vertical direction.

6. The vehicular camera apparatus of claim 3, wherein the anamorphic lens includes at least one of a cylindrical lens, a toric lens, and a prism lens.

7. The vehicular camera apparatus of claim 3, wherein the lens unit further includes a base lens having a focal distance in the first direction and a focal distance in the second direction that is equal to the focal distance in the first direction of the base lens, and
    wherein the focal distance of the lens unit in the second direction is determined by a focal distance of the base lens in the second direction.

8. The vehicular camera apparatus of claim 7, wherein the focal distance of the lens unit in the first direction is determined by the focal distance of the base lens in the first direction and the focal distance of the anamorphic lens in the first direction.

9. The vehicular camera apparatus of claim 7, wherein the anamorphic lens has negative (−) refractive power in the first direction and has no refractive power in the second direction.

10. The vehicular camera apparatus of claim 7, wherein the anamorphic lens has positive (+) refractive power in the first direction and has no refractive power in the second direction.

11. The vehicular camera apparatus of claim 1, wherein a FOV in the second direction in the first FOV range is equal to an FOV in the second direction in the second FOV range.

12. The vehicular camera apparatus of claim 1, wherein the processor detects a first object in the first region, determines a size of the first object based on a pixel number corresponding to the first object in the first region, detects a second object in the second region, and determines a size of the second object based on a pixel number corresponding to the second object in the second region.

13. The vehicular camera apparatus of claim 12, wherein the processor determines the size of the first object based on a first ratio and determines the size of the second object based on a second ratio that is different from the first ratio.

14. The vehicular camera apparatus of claim 1, wherein the second pixel density gradually decreases in the direction away from the center of the image sensor along the first direction.

15. The vehicular camera apparatus of claim 1, wherein the second direction is orthogonal to the first direction.

16. The vehicular camera apparatus of claim 1, further comprising a housing that forms an outer appearance and accommodates the image sensor and the processor,
wherein:
the housing includes a first housing and a second housing; and
the first housing is formed with a thickness that is increased toward the image sensor.

17. A vehicular stereo camera apparatus comprising:
a first camera; and
a second camera,
wherein the first camera includes:
a first image sensor, and
a processor configured to divide a first image acquired through the first image sensor into a first field of view (FOV) range in a first direction and a second FOV range in the first direction, to process a first region corresponding to the first FOV range in the first image, to process a second region corresponding to the second FOV range in the first image, and to separately process the first region and the second region,
wherein the first image sensor includes:
a first pixel group corresponding to the first region and having a first pixel density, and
a second pixel group corresponding to the second region and having a second pixel density that is less than the first pixel density and that decreases in a direction away from a center of the first image sensor along the first direction, and
wherein each of the first pixel group and the second pixel group has a pixel density that is constant in a second direction different from the first direction.

18. The vehicular stereo camera apparatus of claim 17, wherein:
the second camera includes a second image sensor; and
the processor divides a second image acquired through the second image sensor into the first FOV range in the first direction and the second FOV range in the first direction, processes a third region corresponding to the first FOV range in the second image, processes a fourth region corresponding to the second FOV range in the second image, and separately processes the third region and the fourth region.

19. The vehicular stereo camera apparatus of claim 17, wherein the second pixel density gradually decreases in the direction away from the center of the first image sensor along the first direction.

20. The vehicular stereo camera apparatus of claim 17, wherein the second direction is orthogonal to the first direction.

* * * * *